(12) United States Patent
Ying et al.

(10) Patent No.: US 7,990,089 B1
(45) Date of Patent: Aug. 2, 2011

(54) REPETITIVE ERROR CORRECTION METHOD FOR DISK-DRIVE SPINDLE MOTOR CONTROL SYSTEMS

(75) Inventors: Edward Ying, Berkeley, CA (US); Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 508 days.

(21) Appl. No.: 12/192,979

(22) Filed: Aug. 15, 2008

Related U.S. Application Data

(60) Provisional application No. 60/956,240, filed on Aug. 16, 2007.

(51) Int. Cl.
*H02P 6/08* (2006.01)

(52) U.S. Cl. ......... 318/400.13; 318/400.16; 318/400.34; 318/400.35; 360/73.03

(58) Field of Classification Search .................. 318/700, 318/400.01, 400.05, 400.06, 400.13, 400.14, 318/400.16, 400.32, 400.34, 400.35; 360/31, 360/51, 69, 71, 73.01, 73.02, 73.03
See application file for complete search history.

(56) References Cited

U.S. PATENT DOCUMENTS

| | | | | |
|---|---|---|---|---|
| 5,896,353 A * | 4/1999 | Naohara | ................. | 369/44.25 |
| 5,978,169 A | 11/1999 | Woods | | |
| 6,141,175 A | 10/2000 | Nazarian et al. | | |
| 6,411,461 B1 | 6/2002 | Szita | | |
| 6,437,936 B1 | 8/2002 | Chen et al. | | |
| 6,574,067 B2 | 6/2003 | Chen et al. | | |
| 6,751,046 B1 | 6/2004 | Szita et al. | | |
| 6,754,025 B1 * | 6/2004 | Shepherd et al. | .......... | 360/73.03 |
| 6,775,091 B1 | 8/2004 | Sutardja | | |
| 6,847,503 B2 | 1/2005 | Zhang et al. | | |
| 6,947,233 B2 * | 9/2005 | Toda | ................ | 360/51 |
| 6,950,273 B2 | 9/2005 | Nakagawa et al. | | |
| 6,956,711 B2 | 10/2005 | Hanson et al. | | |
| 7,016,140 B1 * | 3/2006 | Schultz et al. | ................. | 360/75 |
| 7,019,926 B2 * | 3/2006 | Chainer et al. | ................. | 360/51 |
| 7,088,547 B1 | 8/2006 | Wang et al. | | |
| 7,106,547 B1 | 9/2006 | Hargarten et al. | | |
| 7,209,312 B1 | 4/2007 | Sutardja | | |
| 7,265,933 B1 | 9/2007 | Phan et al. | | |
| 7,319,570 B2 | 1/2008 | Jia et al. | | |
| 7,378,810 B1 | 5/2008 | Sutardja et al. | | |
| 7,489,469 B2 | 2/2009 | Sun et al. | | |
| 7,508,618 B1 * | 3/2009 | Herbst et al. | .................... | 360/75 |
| 7,564,644 B2 | 7/2009 | Kim et al. | | |
| 7,573,214 B1 * | 8/2009 | Sutardja et al. | ............... | 318/268 |
| 7,656,605 B1 | 2/2010 | Sutardja | | |
| 2006/0098330 A1 | 5/2006 | Takaishi | | |

OTHER PUBLICATIONS

Ying, Edward et al., "Repetitive Error Correction Method For Disk-Drive Servo Control Systems", U.S. Appl. No. 12/258,351, filed Oct. 24, 2008, to be published by the USPTO, 47 pages.

Sutardja, Pantas, "Methods for Repeatable Run-Out Compensation," U.S. Appl. No. 11/471,174, filed Jun. 19, 2006, to be published by the USPTO, 47 pages.

Office Action mailed Feb. 20, 2008 in U.S. Appl. No. 11/471,174, filed Jun. 19, 2006, to be published by the USPTO, 9 pages.

Office Action mailed Sep. 9, 2008 in U.S. Appl. No. 11/471,174, filed Jun. 19, 2006, to be published by the USPTO, 9 pages.

* cited by examiner

*Primary Examiner* — Bentsu Ro

(57) ABSTRACT

Methods, systems and computer program products for compensating repeatable timing variations associated with a spindle motor are described. Specifically, a repetitive error correction factor may be determined using a computational model which predicts timing variations. The correction factor can then be used to cancel the effect of the actual timing variations upon the spindle motor.

26 Claims, 13 Drawing Sheets

REPETITIVE ERROR CORRECTION METHOD FOR DISK-DRIVE SPINDLE MOTOR CONTROL SYSTEMS

CROSS-REFERENCE TO RELATED APPLICATIONS

This application claims priority to U.S. Provisional Application Ser. No. 60/956,240 titled "REPETITIVE ERROR CORRECTION METHOD FOR DISK-DRIVE SPINDLE MOTOR CONTROL SYSTEMS," filed on Aug. 16, 2007, the disclosure of which is incorporated herein by reference in its entirety.

TECHNICAL FIELD

The subject matter of this application is generally related to servo systems.

BACKGROUND

Some data storage systems, such as disk drive systems, use a spindle motor to change the position of storage regions with respect to a spindle mechanism for reading and writing to the storage regions. A disk drive data storage system typically includes one or more disks or platters for storing information, and the spindle motor may be used to rotate the platters. Subsequently, a read/write head may read information from or write information to the storage regions on the platters.

In order to accurately position the read/write head with respect to a storage region on a platter, variations in the rotational speed of the platter are kept at a minimum during operation. Specifically, once a spindle motor for rotating the platters has been accelerated to an operational speed, a spindle motor control system is used to maintain the operational speed.

However, external forces or disturbances exist in the disk drive system that would interfere with speed control of the spindle motor. One such disturbance is the repeatable timing run-out (RTRO).

SUMMARY

Methods, systems and computer program products for compensating repeatable timing variations associated with a spindle motor are described. Specifically, a repetitive error correction factor may be determined using a computational model which predicts timing variations. The correction factor can then be used to cancel the effect of the actual timing variations upon the spindle motor.

In some implementations, a method is provided that includes receiving a command associated with a spindle motor. Based on the received command, a first timing mark interval can be predicted. The method also includes receiving a second timing mark interval. From the first timing mark interval and the second timing mark interval, an error can be determined, and a correction factor can be identified. The identified correction factor can then be used to control the spindle motor.

In some implementations, a method is provided that includes receiving one or more parameters associated with a spindle motor. Based on the receiving parameters, a model function can be developed, and a timing parameter of a timing mark interval can be predicted using the model function. The method also includes determining a correction factor from the predicted timing parameter, and the spindle motor can be compensated based on the correction factor.

In some implementations, a method is provided that includes spinning up a spindle motor to an operating speed. A prediction model using one or more timing parameters associated with the spindle motor can be developed. The spindle motor can be calibrated during a first period using the prediction model to obtain a calibrated timing interval. The spindle motor then can be compensated based on the calibrated timing interval to cancel out timing variations associated with the spindle motor during a second period.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Hard Disk Drive System Overview

Figure 1:
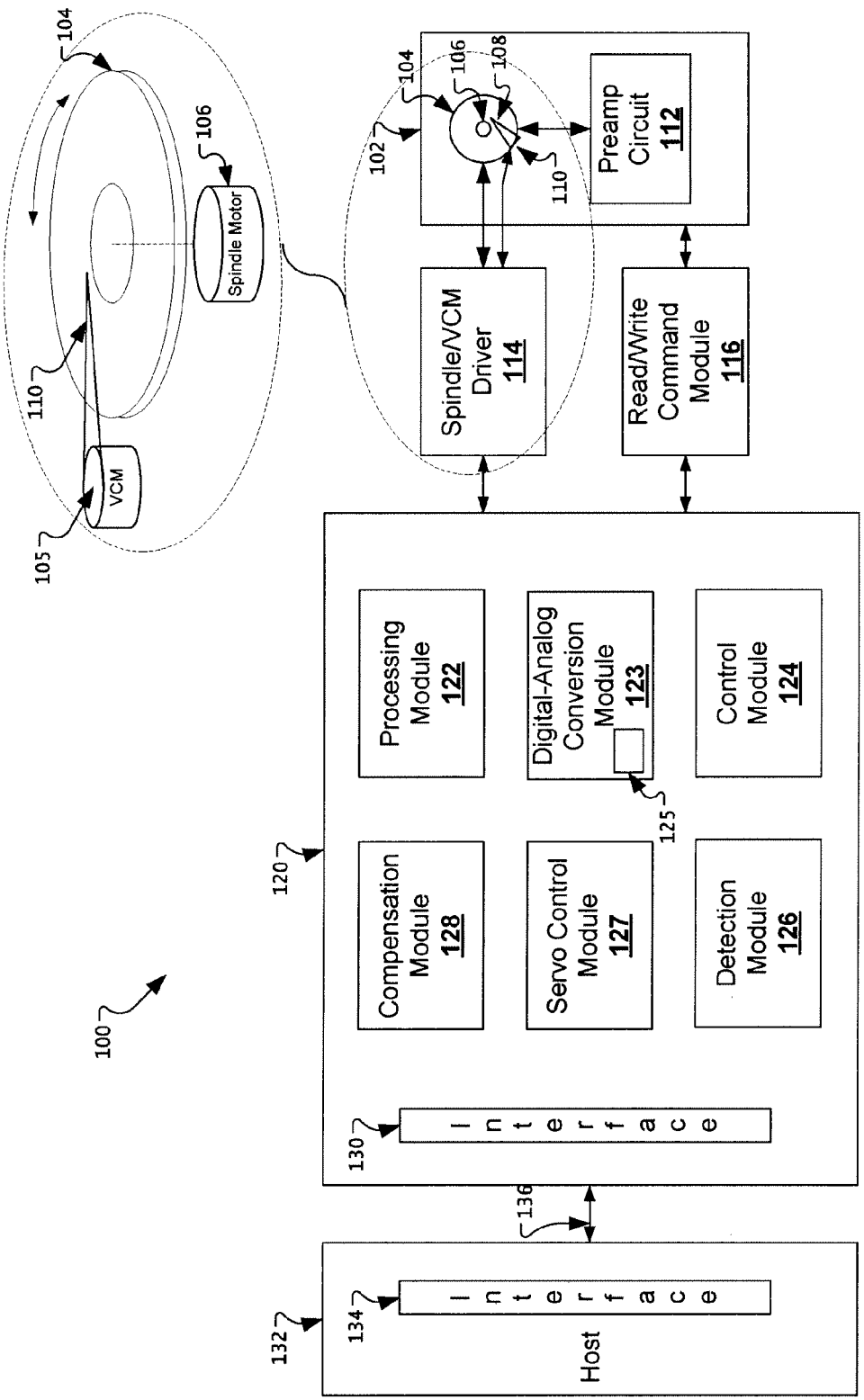
FIG. 1 shows an example hard disk drive (HDD) system.

FIG. 1 shows an example hard disk drive (HDD) system 100. The HDD system 100 includes a head assembly 102 including one or more platters 104, a voice coil motor (VCM) 105, a spindle motor 106, a read/write head 108, an actuator arm 110, a pre-amp circuit 112, a spindle/VCM driver 114, a read/write command module 116 and a printed circuit board (PCB) 120.

Signals between the head assembly 102 and the PCB 120 can be carried, for example, through a flexible printed cable. The head assembly 102 may include one or more magnetic disks or platters 104 for storing magnetic data. The platters 104 may be rotated by the spindle motor 106. The spindle motor 106 may rotate the platters 104 at a controlled speed during the read/write operations. The read/write actuator arm 110 may move relative to the platters 104 in order to read and/or write data to/from the platters 104. The spindle/VCM driver 114 may be configured to control the spindle motor 106, which rotates the platters 104. If desired, the spindle/VCM driver 114 also may generate control signals for positioning the read/write actuator arm 110 using the voice coil actuator 105, a stepper motor or any other suitable actuator.

The read/write head 108 may be located near a distal end of the read/write actuator arm 110. The read/write head 108 may include a write element (e.g., an inductor) that generates a magnetic field, and a read element (e.g., a magneto-resistive (MR) element) that senses the magnetic field on the platters 104.

The HDD head assembly 102 also may include a preamp circuit 112. The preamp circuit 112 may operate either in a read mode or write mode, and may communicate with one or more transducers (not shown). A transducer may generate a low level analog read signal, and send the analog read signal to the preamp circuit 112 to produce an amplified read signal. During a user-data read operation, the amplified read signal serially defines the servo information and user data. The servo information may include positioning data information such as track identification data information and fine positioning information. During a write operation, the preamp circuit 112 also may provide write current via a write data signal to a selected transducer for writing a sequence of symbols onto the platters 104. Typically, the write current changes polarity upon each change in the binary value of the write data signal.

The PCB 120 includes a processing module 122, a digital-analog conversion module 123 having a digital-analog converter 125, a control module 124, a detection module 126, a servo control module 127, a compensation module 128 and a communications interface 130, each of which is connected through one or more internal buses (not shown).

The processing module 122 may perform data and/or control processing related to the general operation of the HDD system 100. For example, the processing module 122 may execute instructions received from the control module 124 to control disk drive functions. These functions may include, for example, reading and decoding host commands, starting up and controlling the speed of the spindle motor 106, minimizing head positioning servo off track error through the control of the voice coil motor 105, and managing power consumption of the HDD system 100.

The processing module 122 may include volatile memory (e.g., SDRAM or other types of low latency memory) for storing, for example, volatile control data associated with the control of the HDD system 100, and non-volatile memory (e.g., flash memory) for storing, for example, critical data such as non-volatile control code. The control data and control code may include instructions the processing module 122 executes or utilizes as well as tables, parameters or arguments used during the execution of these instructions. In some implementations, the processing module 122 also may store various firmware routines for controlling the operation of the spindle motor 106 such as, without limitation, startup routines, speed control routines, spin down routines and parking routines.

The processing module 122 may include registers and buffers for storing, for example, flags indicating whether a spin-up operation has been successfully completed. Alternatively, the flags may be stored in a register defined by a memory location in a memory unit separate from the processing module 122.

In some implementations, the processing module 122 may include a pulse width modulation (PWM) controller (not shown) for generating control signals so as to control the spindle/VCM driver 114 to drive the spindle motor 106 at a substantially constant speed while the disk drive is in use. The spindle/VCM driver 114 may receive VCM control signals from the PWM controller and generate a corresponding command signal to command the VCM 105 for positioning the actuator arm 110 and the read/write head 108, for example, as part of a parking operation. The VCM 105 may be controlled by the servo control module 127, and may be configured to apply torque to the actuator arm 110 so as to swing the read/write head 108 during, for example, a track-seeking operation and to maintain the read/write head 108 at a desired angular position during a track-following operation.

The spindle/VCM driver 114 may, in some implementations, include an electromotive force (EMF) detector (not shown) for detecting a back EMF (BEMF) associated with one or more windings of the spindle motor. The control module 124 may communicate with the spindle/VCM driver 114, for example, to receive zero crossing information to be used for identifying the instant at which a zero crossing occurs (e.g., a zero crossing in the BEMF induced in a floating winding), and for determining a spin rate of the spindle motor. As an example, while the spindle motor 106 is rotating, the EMF detector may detect the BEMF zero crossing point for an un-driven winding to generate a zero crossing signal (e.g., by counting clock pulses and determining time elapsed between the consecutive detected zero crossings). The control module 124 may receive the zero crossing signal and provide information associated with the zero crossing signal to the processing module 122, for example, to compute the velocity of the spindle motor 106.

The control module 124 may function to manage and handle data transfer between the PCB 120 and a host 132 during read and write operations through the communications interfaces 130/134. The control module 124 also may include servo logic for managing the positioning of the read/write head 108 when seeking (e.g., moving from one track to a non-adjacent track) and during tracking (e.g., staying on a single track).

The control module 124 may communicate with the communications interface (e.g., an input/output interface) 130 and with the spindle/VCM driver 114 or the read/write command module 116. The control module 124 may coordinate control of the spindle/VCM driver 114, the read/write command module 116, the processing module 122, the detection module 126 and the compensation module 128.

The control module 124 may receive a command from the host 132 to generate a spin-up command while the spindle motor 106 is at rest to begin the spin-up mode of operation. The processing module 122 may receive the spin-up command from the control module 124 and retrieve an associated control routine for the spin-up mode of operation from a memory unit.

During write operations, the read/write command module 116 may encode (e.g., using, run length limited coding (RLL)) data to be written by the read/write head 108 and generate encoded write signals. The read/write command module 116 also may process the write signals providing a reliability check and may apply, for example, error correction coding (ECC) and/or similar algorithms to allow for the verification of the integrity of the data that is written. During read operations, the read/write head 108 may generate read signals (e.g., analog signals), and the read/write command module 116 may convert the analog read signals into digital read signals. The converted signals may be detected and decoded by conventional techniques to recover data written by the read/write head 108.

In some implementations, portions of the HDD system 100 may be implemented as one or more integrated circuits (IC) or chips. For example, the processing module 122 and the control module 124 may be implemented in a single chip. As another example, the spindle/VCM driver 114 and the read/write command module 116 may be implemented in a same (or different) chip as the processing module 122 and the control module 124. As yet another example, the HDD system 100 other than the HDD head assembly 102 may be implemented as a system-on-chip.

In general, the spindle motor 106 may have different power requirements based on different operational configurations. For example, initial acceleration (e.g., during spin-up process) of the spindle motor 106 may require a high value of current relative to operation at steady-state velocity. As the spindle motor 106 reaches a desired operating velocity, the average motor current requirement may decrease substantially to maintain the head at a desired track.

Spindle Motor

In some implementations, the spindle motor 106 may be constructed as a multi-phase motor. For example, the spindle motor 106 may be constructed as a brushless three-phase inductive motor. The three-phase motor may be constructed with a rotating magnet assembly (or spindle) and a stationary coil assembly (or stator). An alternating current may be supplied to the coils of the stator, and the spindle may be rotated by a force created by the alternating current.

The spindle motor 106 may include stationary elements (e.g., the stator) and rotatable elements (e.g., a rotor). The rotor may include a hub that supports each platter. The spindle motor 106 may include a bearing arrangement such as one or more sets of ball bearings so that the rotor may rotate about the stator. The stator may include electromechanical stator components including a stator core having core members that radiate away from the center of the core (or centertap) to define stator poles of the stator, and a set of stator wires (or windings) that are wound around the stator poles and interconnected in a predetermined configuration (e.g., a "Y" configuration). The rotor may include a set of permanent magnets that are arranged to define rotor poles of the rotor.

During operation, the rotation of the rotor causes each disk to spin (e.g., in either a forward-spin or reverse-spin direction). To accelerate the rotor to a normal operating spin rate and subsequently maintain the spin rate substantially constant, applied torque may be generated to overcome stiction and to oppose dynamic frictional forces. To generate the applied torque, current may be applied to one or more of the windings to generate a stator magnetic field. The magnitude of the electromagnetic field may vary and may depend upon the magnitude of the current flow. Similarly, the permanent magnets in the rotor may produce a rotor magnetic field. Various degrees of torque can be produced when the stator magnetic field and the rotor magnetic field interact.

As discussed above, the spindle motor 106 may be implemented as a three-phase motor. In implementations in which a three-phase motor is used, a current may be supplied to two of the three windings of the three-phase motor by applying a voltage between the terminals associated with the two windings and the centertap. The third terminal may be left floating such that the voltage seen on the third terminal is the voltage (e.g., a sinusoidal voltage) induced by the movement of the rotating magnets relative to the windings. Of course, other modes are possible. For example, current may flow through only a single winding between one of the winding terminals and the centertap, while no current flows through either of the other two windings. As another example, current may flow through all three of the windings. Generally, a spin-up process may be performed by applying, for example, a DC voltage across a selected combination of the windings to generate a positive torque on the rotor to accelerate the spindle motor 106 to an operating spin rate.

Given the three terminals and two polarities of current direction for each winding terminal, the current may be supplied to the windings in six different commutations (or states). The spindle motor 106 may be driven by sequencing through these six states repeatedly. For example, the spindle motor 106 may cycle from one commutation (e.g., where terminal "A" is driven by a high voltage and terminal "B" is allowed to float) to another commutation (e.g., where terminal "A" is now floating while terminal "B" is now driven by a high voltage).

In some implementations, a power supply voltage may be applied to the spindle motor 106 to induce the BEMF on one of the windings by the rotating permanent magnet of the rotor. In these implementations, the motor supply voltage may be a pulse-width modulated three-phase pulsed signal.

In some implementations, BEMF signals may be used for controlling the acceleration of the spindle motor 106 up to a desired operating spin rate. Specifically, by detecting the BEMF signals, the motor speed of the spindle motor 106 may be accurately identified. The detected motor speed can subsequently be used to determine whether a steady-state operational speed has been reached and whether the motor spin-up process is complete. For example, the BEMF signals of the spindle motor 106 may be monitored by the detection module 126 and processed by the control module 124 to generate velocity feedback information (e.g., digital signals indicative of motor speed). Using the velocity feedback information, a corresponding motor speed may be identified. If the identified speed does not meet a predetermined threshold, as will be discussed in greater detail below, a motor voltage signal may be generated for controlling the voltage of the spindle motor 106, which modifies the speed and spin-up time of the spindle motor 106.

In some implementations, for a system having "P" windings and "Q" permanent magnet poles in the rotor (e.g., P poles of permanent magnets 250 shown in FIG. 2A as will be discussed in greater detail below), there may be (P*Q) BEMF signal attributes that may be used for spindle motor control. In these implementations, BEMF signal attributes that may be used for speed control may include zero crossings of the BEMF signals. Of course, other signal attributes also may be used.

Example Structure of Spindle Motor

As already discussed, a disk drive data storage system may include one or more disks or platters for storing information. A spindle motor (such as spindle motor 106) rotates the platters, and the read/write head 108 may then read information from and write information to various memory regions on the platters.

Figure 2A:
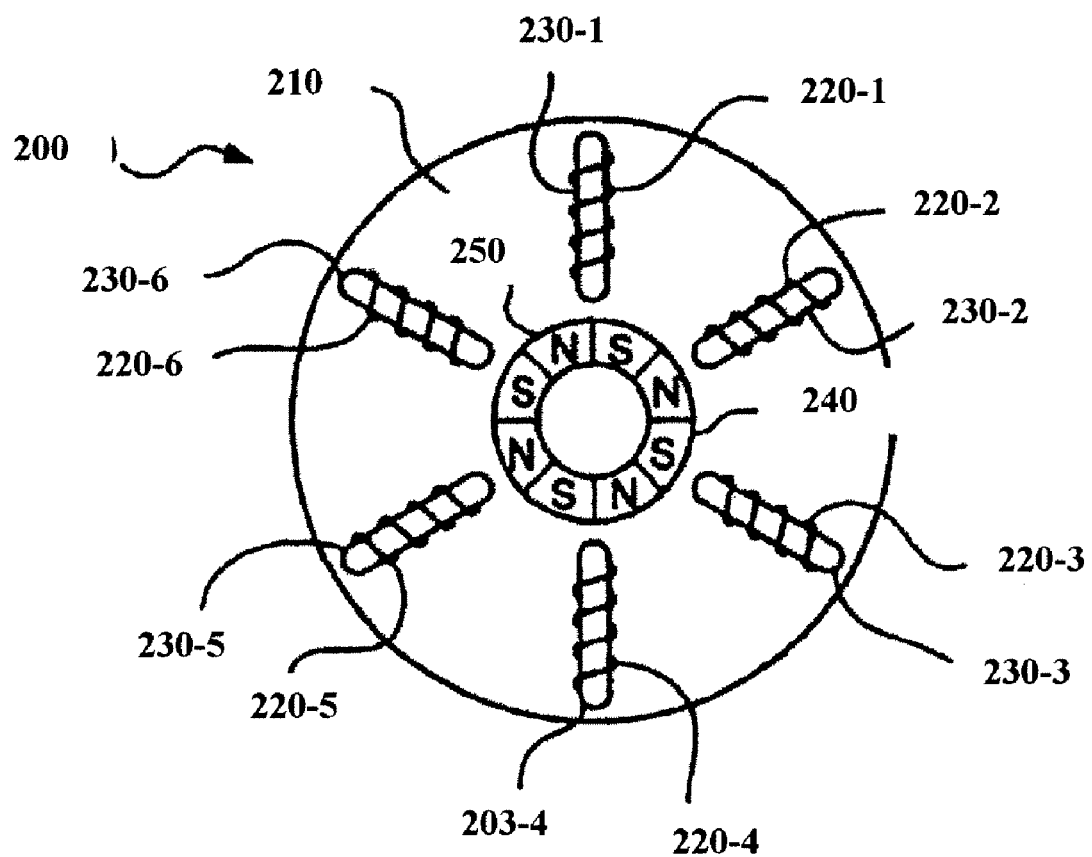
FIG. 2A shows an example spindle motor with a stator having stator windings around six radially distributed stator poles.

In order to accurately read and write data using the read/write head 108, every effort is made to minimize the variations in the rotational speed of the disk. FIG. 2A shows an example spindle motor 200 with a stator 210 having stator windings 220-1 to 220-6 around six radially distributed stator poles 230-1 to 230-6.

As shown in FIG. 2A, the rotor 240 may include one or more permanent magnets 250 each with poles 250-N and 250-S. Current flowing through the stator windings 220-1 to 220-6 may be used to generate an electromagnetic field, which may then interact with the electromagnetic fields generated by the permanent magnets 250. Torque generated by this electromagnetic interaction may cause the rotor 240 to rotate with respect to the stator 210.

Once the spindle motor 200 has been accelerated to a desired operational speed (or spin rate), the spindle motor 200 may be controlled to maintain the desired operational speed. During each rotation of the spindle motor 200, some energy may be dissipated (e.g., dissipated as heat due to friction). As a result, windings 220-1 through 220-6 may need to be energized (or re-energized) to provide the required torque to maintain the desired rotational speed.

In these implementations, to sustain the required torque, additional energy may be provided to the spindle motor 200 by applying voltages to the windings 220-1 to 220-6 at appropriate intervals. For example, at a particular interval $T_0$, current may be generated in winding 220-1 by applying a positive voltage (e.g., +5 volts) to winding 220-1. Also at $T_0$, current may be generated in winding 220-3 to flow in the opposite direction in winding 220-3 by applying a ground or negative voltage to winding 220-3. Winding 220-2 may not be energized at time $T_0$. As the permanent magnets 250 of rotor 240 rotates with respect to winding 220-2, the changing magnetic flux may generate a BEMF and associated signals, which induces current flow in winding 220-2. As already discussed, the induced current may be detected and used in a feedback system (e.g., as velocity feedback information) to maintain the desired rotational speed.

Alternate Spindle Motor Structure

While the spindle motor 200 described in FIG. 2A may allow a spindle motor speed to be maintained within acceptable limits in some systems, the proposed configuration may also lead to unacceptable speed variations in others. For example, the spindle motor 200 may provide sufficient speed control in large form factor disc drives (e.g., 3.5" and 2.5" drives) but not smaller form factor drives (e.g., 1" and 0.85" drives). Smaller form factor drives generally have smaller moments of inertia, and thus smaller angular momenta for comparable rotational speeds. The coarse controls described above that are acceptable in larger form factor drives may cause unacceptable speed changes over the course of a single rotation of the rotor in a small form factor device.

Additionally, typical manufacturing processes used to produce the stator assemblies of the spindle motor 200 may introduce asymmetry in the assemblies. As a result, the poles 250 may not be precisely spaced in the spindle motor 200 (e.g., for a spindle motor with six poles, the angular spacing of the poles may be different than the desired value of $\pi/3$). Although such an asymmetry may not unduly affect motor operation in a spindle control system where BEMF is monitored in a single pole to determine the rotational speed of the rotor, asymmetry may introduce unacceptable inaccuracy when BEMF is monitored in multiple windings over the course of a single rotation. For example, assuming that the BEMF is being monitored in each winding 220-1 through 220-6 of FIG. 1, if poles 230-1 through 230-6 were spaced symmetrically on stator 210 (e.g., each with angular separation of $\pi/3$ from the next), the time between successive BEMF pulses could be compared to $\tau_{Ref}/6$ (where $\tau_{Ref}$ is the revolution time corresponding to a desired motor speed) to generate current in windings 220-1 through 220-6 to maintain the desired spindle motor speed.

However, this process of maintaining the desired spindle motor speed could be imprecise if poles 230-1 through 230-6 are not spaced symmetrically around stator 210. Assuming that the rotor 240 is at a desired rotational speed, if the angular spacing between pole 230-1 and pole 230-2 is less than $\pi/3$, the measured time between these two poles would be less than $\tau_{Ref}/6$, even though the rotor 240 is at the correct angular speed. As a result, the spindle motor control may modify the current in the windings 220-1 through 220-6 to decrease the speed of rotation. Similarly, if the angular spacing is greater than $\pi/3$, the spindle motor control may modify the current in the windings 220-1 through 220-6 to increase the speed of rotation. Thus, asymmetry in the placement of the poles may prevent accurate speed control.

Figure 2B:
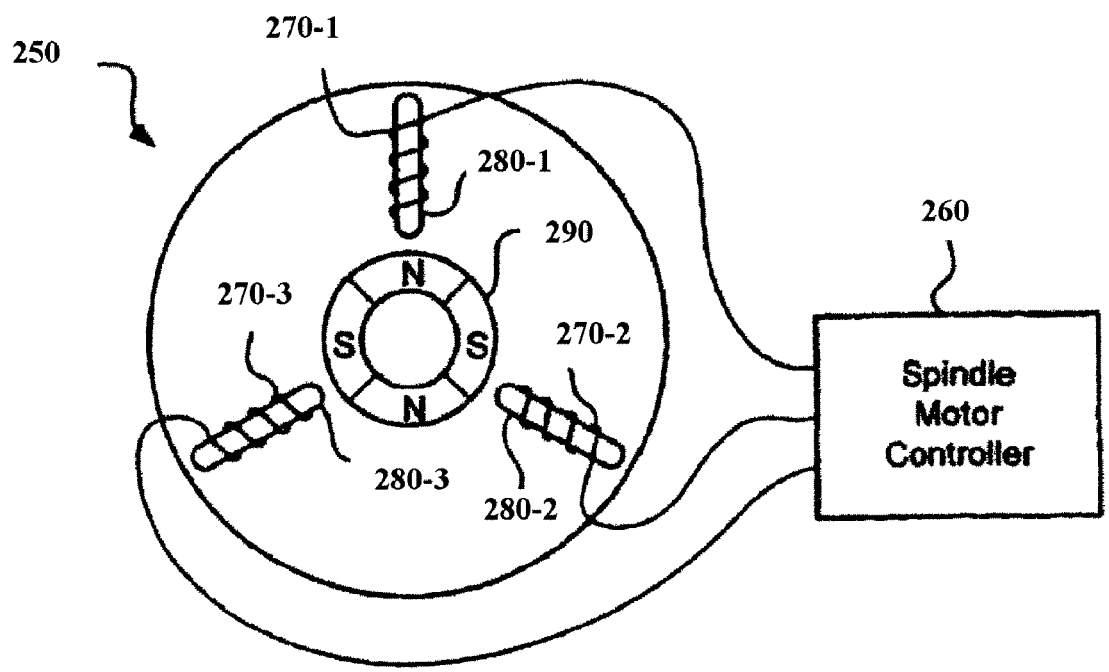
FIG. 2B shows an alternative spindle motor.

FIG. 2B shows an alternative spindle motor 250. In some implementations, the spindle motor 250 may be an asymmetric spindle motor controlled by a spindle motor controller 260. As shown, the spindle motor 250 may include three stator poles 270-1 to 270-3, three windings 280-1 to 280-3, and a rotor 290 with magnets 290 and four poles. In some implementations, poles 270-1 and 270-3 may be separated by $2\Pi/3$. In these implementations, pole 270-2 may be closer to pole 270-1 than 270-3.

Windings 280-1 through 280-3 may be in communication with a spindle motor controller 260. The spindle motor controller 260 may receive signals indicative of the BEMF in each of the windings, and control the voltage across the windings used to generate torque in the spindle motor 250.

In some implementations, signals from windings 230-1 to 230-3 may be received through one or more inputs of the spindle motor controller 260. In these implementations, the spindle motor controller 260 also may include a signal processor, a data processor and memory. BEMF signals received through the inputs may be processed by the signal processor, which may subsequently provide signal-related data to the data processor. The data processor may process signal-related data, and may also access additional data from the memory. The data processor may then determine one or more parameters for controlling the spindle motor speed based on the processed BEMF signals and signal-related data. The parameters may then be provided to the signal processor, which may transmit associated output signals to the windings 280-1 to 280-3 via the inputs of the spindle motor controller or via one or more separate outputs. In some implementations, the one or more parameters may include correction factors. Further description regarding the use of correction factors may be found in U.S. patent application Ser. No. 10/752,601, now issued as U.S. Pat. No. 7,378,810, the disclosure of which is incorporated herein by reference in its entirety.

Although the spindle motor controller 260 is shown as a single unit in FIG. 2B, its functionality may be implemented in multiple units. Further, controller functionality may be implemented at least partially using software.

Servo Control Module

Referring again to FIG. 1, information may be stored on each platter 104 in concentric tracks. Data tracks may be divided into sectors. Information may be written to and/or read from a storage surface(s) of a platter 104 by the read/write head 108. The read/write head 108 may be mounted on the actuator arm 110 capable of moving the read/write head 108, e.g., radially over the platter 104. The movement of the actuator arm 110 may allow the read/write head 108 to access different data tracks. The platters 104 may be rotated by the spindle motor 106 at a relatively high speed. The read/write head 108 may access different sectors within each track on the platter 104.

Operation of the actuator arm 110 may be controlled by the servo control module 127. The servo control module 127 may move the read/write head 108 according to two primary operations: seek control operation and track following operation.

In a seek control operation, the servo control module 127 controls the actuator arm 110 such that the read/write head 108 may be transitioned from an initial position to a target track position for which the host 132 has requested. A seek control operation generally includes accelerating, decelerating and settling the VCM 105 at a predetermined speed. In general, the servo control module 127 may initiate a seek control operation when the host 132 issues, for example, a seek command to read data from or write data to a target track on the platters 104.

As the read/write head 108 approaches a target track, the servo control module 127 may settle the actuator arm 110. During settling, the servo control module 127 may bring the read/write head 108 to rest over a target track within a selected settle threshold or window, which may be based on a percentage of the track width from the center of the track. The servo control module 127 may employ, for example, a pre-loaded algorithm, to ensure that the read/write head 108 is positioned on the target track with sufficient accuracy to write (and read). This process may require counting servo position samples occurring within the settle window. For example, a write operation may be initiated after observing one or more consecutive positioning samples that are within certain area of a data track. Of course, a wide variety of settle criteria may be employed, in ensuring positioning accuracy.

After the read/write head 108 is settled over a desired track, the servo control module 127 may initiate a track following mode. In the track following mode, the read/write head 108 may be positioned and maintained at a desired position with respect to the target track (e.g., over a centerline of the track) or over a defined radial location along a track on the disk until desired data transfers are complete and another seek is performed, as will be discussed in further detail below.

The digital-analog conversion module 123, which includes a digital-analog converter 125, can operate to convert data between the digital form used by the PCB 120 and the analog form conducted through the read/write head 108 in the head assembly 102. The head assembly 102 can provide servo position information read by the read/write head 108 to the servo control module 127. Servo sectors on each of the platters 104 can include head location information, such as a track identification field and data block address, for identifying a target track and data block, and burst fields to provide servo fine location information. The head location information read by the read/write head 108 may be converted from analog signals to digital data by the digital-analog converter 125, and fed to the servo control module 127. The servo positional information can be used to detect the location of the read/write head 108 in relation to a target track or target data sectors on the platters 104. The servo control module 127 may utilize, for example, target data sectors and servo position information to precisely place the read/write head 108 over the target track and data sector on the platters 104, and to continuously maintain the read/write head 108 aligned with the target track while data is written/read to/from one or more identified data sectors.

The digital-analog conversion module 123 may include a digital-analog converter (DAC) 125 for converting control signals (e.g., for controlling the position of the read/write head 108) generated by the control module 124 into analog signals (and from analog signals into digital data). For example, a head position signal may be generated by the control module 124 and provided to the DAC 125. The DAC 125 then may convert the head position signal into an analog signal (e.g., a voltage signal) for driving the VCM 105 coupled to the actuator arm 110. The actuator arm 110 may subsequently move the read/write head 108 along the surface of the platters 104 based on the analog signal provided by the DAC 125.

In some implementations, the DAC 125 may be configured to output, for example, different analog voltage ranges to account for resolution needs at different operating conditions. In these implementations, the DAC 125 may have one or more selectable modes. For example, the DAC 125 may utilize certain modes (e.g., referred to here as "higher modes") to provide a larger voltage range and bigger current scale but at a lower resolution (volts/digital count). In these implementations, higher modes may be used, for example, during seeking control operations where a large voltage range is generally desirable. Conversely, the DAC 125 may employ other modes (e.g., referred to here as "lower modes") to provide a higher resolution (e.g., smaller voltage steps per digital count). Lower modes may be used, for example, for tracking following operations where high resolution is critical to servo tracking performance.

Repeatable Runout

Different attributes of the BEMF signals may be used to provide information for speed control. In some implementations, the spindle motor control loop processing the BEMF signals and signal-related data may be a phase-locked loop (PLL). In these implementations, a timing feedback signal may be phase-locked to a reference clock with a targeted interval spacing. The time difference between the spindle BEMF timing marks (e.g., the zero crossings of the BEMF signals for each of the windings) and the nearest reference clock edge may represent the phase error of the spindle motor PLL. The phase error may be determined from a timing mark (such as a zero crossing of the BEMF signal) and a reference clock edge by subtracting the reference clock edge from the timing mark to arrive at the phase error. The phase error may then be used in a feedback system to control the spindle motor 106.

However, as discussed above, due to mechanical tolerances of motor windings and magnetic poles, BEMF signals received from the windings and poles are not always accurate (e.g., due to asymmetry or unequal spacing between the poles). As a result, the unequal spacing and inaccurate speed control resulting from the unequal spacing can give rise to repeatable variations or run-out of the timing intervals (RTRO).

Additionally, the read/write head 108 may be positioned by a servo system to a fixed position as defined in information contained in the servo wedges (servo track following). Specifically, the read/write actuator arm 110 may be moved to a predetermined servo track so that the read/write head 108 may be in a proper position to perform a desired operation (read or write). Ideally, the servo information may be written concentrically or in spiral form with respect to the spindle motor axis. However, it is possible that either the servo information may not be written concentrically during a servo write operation, or that the platter may not be exactly perpendicular to the axis of rotation. Because of these two possible contingencies, the actuator current which drives the actuator arm 110 must be adjusted to "track-follow" even when there are no other external forces or disturbances. The repeatable portion of these built-in disturbances also may give rise to RRO.

For self servo write, disturbances such as RTRO and other dimension changes during spiral writing can lead to position errors and affect the accuracy of writing and reading servo information. For example, RTRO may affect the relative geometry between the disk and the actuator to thereby distort the spiral shape away from that desired. As a result, written servo patterns could have repeatable spacing variations, rendering position information stored in the servo patterns inaccurate.

In some implementations, the timing runout associated with RTRO may be compensated by predicting the RTRO and subsequently subtracting the predicted RTRO from the actual value so that the disturbances may be properly accounted for. More specifically, the instantaneous RTRO of each timing interval ($R_p$) may be predicted from a computational model based on one or more parameters of the spindle motor 106, with inputs from a spindle motor DAC (SPM DAC) command which feeds into the DAC 125 and a spindle motor timing error (STE). In these implementations, the instantaneous RTRO may be, for example, low-pass filtered (e.g., to improve performance or to filter timing error values) and stored in a single revolution delay buffer in order to construct a periodic signal generator (PSG) which outputs a feed-forward command-based repetitive error correction ($FF_{REC}$). The feed-forward command-based repetitive error correction ($FF_{REC}$) may be added to the spindle motor timing error (STE) to form a corrected STE (CSTE). The corrected STE (CSTE) may then be fed to a phase-locked loop or frequency-locked loop compensator.

Repetitive Error Correction

Figure 3:
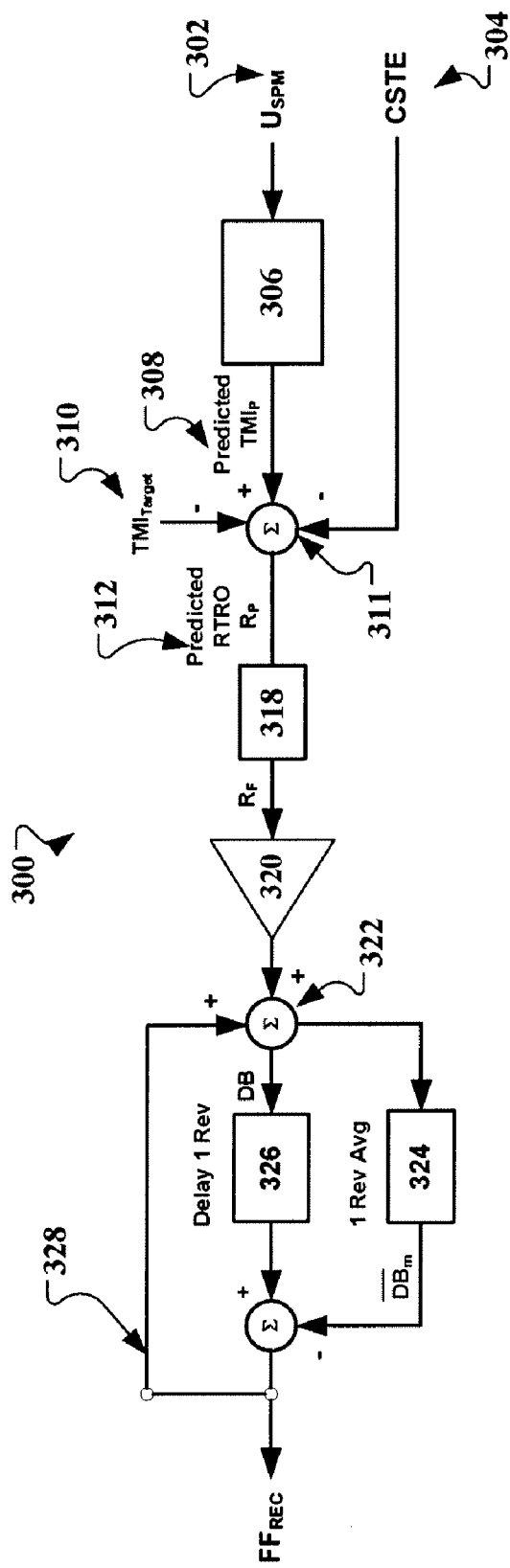
FIG. 3 shows a block diagram of an example repetitive error correction (REC) module for determining a forward command-based repetitive error correction.

In some implementations, the performance of repetitive error correction (REC) may depend on an accurate SPM model in order that an accurate estimate of the RTRO may be obtained. The feed-forward command-based repetitive error correction ($FF_{REC}$) may be determined by a REC module (e.g., REC module 402 shown in FIG. 4), which provides an estimate of the RTRO. The feed-forward repetitive error correction value ($FF_{REC}$) associated with a particular BEMF timing mark "i" ($FF_{REC}(i)$), in some implementations, may be calculated once per revolution. The estimated RTRO may then be used to cancel the effect of the actual RTRO upon the spindle motor (e.g., spindle motor 106). FIG. 3 shows an example block diagram of a REC module 300 for determining a forward command-based repetitive error correction ($FF_{REC}$).

As discussed above, in some implementations, the spindle motor control loop processing the BEMF signals and signal-related data may be a phase-locked loop (PLL). In some implementations, the control loop may be configured as a frequency-locked loop (FLL). The SPM control loop may be part of the SPM controller (e.g., spindle motor controller 260). The PLL or FLL logic may be implemented in hardware or in software (e.g., which may be loaded onto a data processor of the spindle motor controller).

In implementations where a PLL is employed, the rotational angle (e.g., phase) of the SPM may be regulated to follow a target phase profile (e.g., which may be linear in time). In some implementations, the slope of the target phase profile may equal the target velocity or frequency. Specifically, the SPM phase or angular position may be phase-locked to a desired target phase profile. Since the target phase profile may be derived from a fixed target rotational velocity or frequency, the SPM rotational frequency also may be locked to the target frequency.

In implementations where an FLL is used, the rotational velocity (frequency) of the SPM may be controlled to follow a constant target velocity or frequency (e.g., the SPM is "frequency-locked" to the target frequency).

As shown in FIG. 3, the REC module 300 may receive a SPM DAC command ($U_{SPM}$) 302 including a corrected STE (CSTE) 304 as input. Temporarily referring to FIG. 4, the SPM DAC command ($U_{SPM}$) may be an output of the compensator 408 which may be formed as a part of the spindle motor velocity control loop. The SPM DAC command ($U_{SPM}$) may be fed to a spindle module 410 that may include a digital-analog converter (e.g., DAC 125) and a spindle/VCM driver (e.g., spindle/VCM driver 114). The digital-analog converter may output a voltage signal to the spindle/VCM driver, and in response, the spindle/VCM driver may output a drive voltage to the spindle motor.

In some implementations, the digital-analog converter may include one or more DACs. For example, the DAC 125 may include a SPM DAC and a VCM DAC. In this example, the SPM DAC may be used to control SPM motions of the spindle motor 106, and the VCM DAC may be used to control head motions of the spindle motor 106. More specifically, the SPM DAC command ($U_{SPM}$) 302 may be fed to the SPM DAC. A separate DAC command also may be generated (e.g., by VCM or head position control algorithm), which then may be fed to the VCM DAC In some implementations, the SPM DAC command 302 may be automatically generated by the compensator 408 described by a discrete-time transfer function. Where an FLL is used, the discrete-time transfer function may be determined by determining the spindle motor timing error (STE) at control sample "k" (e.g., $STE(k)=TMI_m(k)-TMI_{target}$). In some implementations, the target BEMF timing mark interval $TMI_{target}$ may be given as, for example, $\tau_{Ref}/6$, and the $TMI_m(k)$ may be given as a measured or detected BEMF timing mark interval.

The SPM DAC command ($U_{SPM}$) may be determined via the compensator 408 by, for example, updating the S integral (e.g., $STE_i(k)=STE_i(k-1)+STE(k)$) and applying a proportional-integral control law to the SPM DAC command ($U_{SPM}$) (e.g., $U_{SPM}(k)=K_{FP} \cdot STE(k)+K_{FI} \cdot STE_i(k)$ where $K_{FP}$ may be an FLL proportional gain and $K_{FI}$ may be an integral gain). The discrete-time transfer function of the FLL compensation filter then may be given as [1]:

$$COMP_{FLL}(z) = \frac{(K_{FP} + K_{FI}) \cdot z - K_{FP}}{z - 1} \quad [1]$$

where z may be the unit-delay operator.

In implementations where an PLL is used, the discrete-time transfer function may be determined by determining the spindle motor phase error (SPE) at control sample "k" (k>0), as may be given by [2]:

$$SPE(k) = \left[\sum_{i=1}^{k} TMI_m(i)\right] - k \cdot TMI_{target} = \sum_{i=1}^{k} [TMI_m(i) - TMI_{target}] \quad [2]$$

In some implementations, SPE and $STE_i$ may be set as being equal (e.g., $SPE(k)=STE_i(k)$). The SPM DAC command ($U_{SPM}$) may be determined via the compensator 408 by, for example, updating the SPE integral (e.g., $SPE_i(k)=SPE_i(k-1)+SPE(k)$) and applying a proportional-integral control law to determine the SPM DAC command ($U_{SPM}$) (e.g., $U_{SPM}(k)=K_{PP} \cdot SPE(k) K_{PI} \cdot SPE_i(k)$ where $K_{PP}$ is an PLL proportional gain and $K_{PI}$ is an integral gain). The discrete-time transfer function of the PLL compensation filter then may be given as [3]:

$$COMP_{PLL}(z) = \frac{(K_{FP} + K_{FI}) \cdot z^2 - K_{FP} \cdot z}{(z-1)^2} \quad [3]$$

The SPM DAC command 302 may be applied as an input to a model function 306. In some implementations, the model function 306 includes a SPM model function ($G_{SPM}$) 306. In these implementations, the SPM model function ($G_{SPM}$) 306 may be a model function that may be determined based on the specification supplied from the manufacturer.

Alternatively, the SPM model function ($G_{SPM}$) 306 may be characterized using a continuous-time frequency state equation that may be analytically constructed. In some implementations, the continuous-time frequency state equation may be given by [4]:

$$\dot{\omega} = \frac{K_T}{J \cdot R} U_{SPM} - \frac{K_T^2}{J \cdot R} \cdot \omega \quad [4]$$

where "$\omega$" is the spindle frequency (rad/sec), "$U_{SPM}$" is the drive voltage of the SPM DAC command, "R" is the motor resistance ($\Omega$), "$K_T$" is the torque factor (N-m/amp) and "J" is the motor inertia (Kg-m/sec$^2$).

From the frequency state equation as defined in [4], the continuous-time frequency state model may be transformed to a TMI-based continuous-time state model and then discretized. More specifically, using the frequency ($\omega$) to TMI state transformation given by [5], $$TMI_P = \frac{2\pi}{N \cdot \omega} \Rightarrow \dot{\omega} = -\frac{2\pi}{N} \cdot \frac{T\dot{M}I_P}{TMI_P^2} \quad [5]$$

the continuous-time frequency state equation [4] may be converted into a discrete-time TMI state equation as may be given by [6]:

$$TMI_P(k+1) = A \cdot TMI_P(k) - B \cdot TMI_P(k)^2 \cdot U_{SPM}(k) \quad [6]$$

where "k" is the SPM control sample number and where A may be defined as [7]:

$$A = 1 + T_S \cdot C \cdot K; \quad [7]$$

where B may be defined as [8]:

$$B = \frac{T \cdot C}{2\pi} \quad [8]$$

where "T" is the nominal control sample time; and where C may be defined as [9]:

$$C = \frac{K_T}{J \cdot R} \quad [9]$$

Thus, applying one or more functions provided by the SPM model function ($G_{SPM}$) 306 to the SPM DAC command ($U_{SPM}$) 302 yields a predicted timing mark interval ($TMI_p$) 308 based on equation [10]:

$$TMI_p = G_{SPM}(U_{SPM}) \quad [10]$$

In some implementations, the predicted timing mark interval ($TMI_p$) 308 provides a predicted measurement of the timing mark interval associated with the BEMF signals (e.g., the zero crossings of the BEMF signals for each of the windings). In some implementations, the predicted timing mark interval ($TMI_p$) 308 may be used for estimating the value of the repeatable timing run-out. More specifically, to estimate (and predict) the value associated with the repeatable timing run-out ($R_p$) 312, a targeted BEMF timing mark interval ($TMI_{Target}$) 310 may be subtracted from the predicted timing mark interval ($TMI_p$) 308, the result of which may then be integrated (e.g., through the adder 311) with the corrected STE (CSTE) 304 to arrive at the predicted repeatable timing run-out ($R_p$) 312, which may help predict the RTRO. To determine the predicted repeatable timing run-out ($R_p$) 312, a measured BEMF timing mark interval TMI ($TMI_m$) may be obtained, which may be represented by [11]:

$$TMI_m = TMI + RTRO \quad [11]$$

Where RTRO is the repeatable timing variation, the BEMF timing mark interval (TMI) may represent a timing mark interval uncorrupted by RTRO variations. Ideally, when the spindle motor is "up-to-speed", the BEMF timing mark interval (TMI) may be equal to the target BEMF timing mark interval ($TMI_{target}$). However, the BEMF timing mark interval (TMI) may differ from the target BEMF timing mark interval ($TMI_{target}$) by a small measurement noise or error, as may be given by [12]:

$$TMI = TMI_{target} + \Delta_m \quad [12]$$

where $\Delta_m$ may be the measurement error, a non-repetitive or random value with a magnitude much smaller than the target BEMF timing mark interval ($TMI_{target}$). From [11] and [12], the timing error difference equation may then be given as [13]:

$$STE = TMI_m - TMI_{target} = TMI + RTRO - TMI_{target} = RTRO + \Delta_m \quad [13]$$

The predicted BEMF timing mark interval ($TMI_p$) with respect to the timing mark interval (TMI) may then be given as [14]:

$$TMI_p = TMI + \Delta_p \quad [14]$$

where $\Delta_p$ may be a prediction error due to uncertainties in the SPM model, a non-repetitive or random value with a magnitude smaller than the timing mark interval (TMI). Thus, by combining [12] and [14] (i.e., combination of measurement and prediction error), the difference between the target and the predicted BEMF timing mark interval TMI may be given as [15]:

$$TMI_p - TMI_{target} = \Delta_m + \Delta_p \quad [15]$$

By subtracting STE from [15] and combining with [13], equation [16] may be obtained:

$$TMI_p - TMI_{target} - CSTE = -RTRO + \Delta_p \quad [16]$$

Finally, the predicted repeatable timing run-out ($R_p$) 312 may be determined as [17]:

$$R_p = TMI_p - TMI_{target} - CSTE \quad [17]$$

The corrected STE (CSTE) 304, in some implementations, may be determined based on a forward command-based repetitive error correction ($FF_{REC}$) previously determined (e.g., in a previous cycle), which is to be added to the spindle motor timing error (STE), as may be given by [18]:

$$CSTE(k) = STE(k) + FF_{REC}(k) \quad [18]$$

In some implementations, the compensator 408 may apply a compensation filter (COMP) to the corrected STE (CSTE) to determine the SPM DAC command ($U_{SPM}$). The compensation filter (COMP), in some implementations, may be used to adjust a gain and phase of the closed loop spindle timing error (e.g., STE or CSTE) to generate the SPM DAC command ($U_{SPM}$) such that the timing error may be minimized in the presence of external disturbances or non-zero initial conditions.

The spindle motor timing error (STE), in some implementations, may represent a difference between an actual and a desired SPM timing mark interval, and may be measured based on various parameters such as asymmetry and angular spacing of the SPM poles, timing mark error of a servo sector pattern, disk pack imbalance, timing errors associated with disk eccentricity and the like.

In some implementations, the spindle timing error (STE) may be obtained from register values on the hard-disk controller (HDC) integrated circuit. For example, the HDC may take each BEMF pulse input from the SPM/VCM driver, measure the period of the BEMF pulse through a reference oscillator clock, and compare the measured period to a pre-loaded time interval (e.g., one that specifies a target speed). This difference then may be used as the spindle timing error (STE) which may then be read by control-loop software from one or more associated HDC registers.

As discussed above, the SPM model ($G_{SPM}$) 306 may be analytically determined. However, the SPM model function ($G_{SPM}$) 306 may not always be accurate due to imperfections such as truncation errors and system noise. Therefore, the predicted repeatable timing run-out ($R_p$) 312 cannot always directly cancel the RTRO component(s) due to imprecision of the predicted timing mark interval ($TMI_p$) 308. Thus, in some implementations, the predicted repeatable timing run-out ($R_p$) 312 may be filtered using the filter 318, which may be used to reject measurement noise and other undesired components.

In some implementations, the filter 318 may include a moving average filter (MAF) to generate a filtered output $R_F$. The MAF may be implemented to reduce random noise while retaining a sharp step response, as may be given by equation [19]:

$$MAF(z) = \sum_{i=0}^{n} q_i \cdot z^{-i} \quad \sum_{i=0}^{n} q_i = 1 \quad [19]$$

The filtered output $R_F$ then becomes [20]:

$$R_F(k) = MAF(z) \cdot R_p(k) \quad [20]$$

where "k" is a SPM control sample number.

The filtered output $R_F$ may then be fed as an input to a gain stage 320. In some implementations, the gain stage 320 may be a REC convergence gain ($K_{REC}$) that may be regularly or periodically updated. In some implementations, the REC convergence gain ($K_{REC}$) may be a programmable gain that governs the convergence rate and stability of a REC algorithm. In some implementations, the REC convergence gain ($K_{REC}$) may be determined by tuning it to achieve a balance between fast convergence and noise sensitivity of the STE or SPE.

In some implementations, the REC convergence gain ($K_{REC}$) may be set to be a constant value while the convergence process is in progress. At other times, the REC convergence gain ($K_{REC}$) may be set at zero (e.g., when the adaptation is to be halted) or to a larger or smaller value (e.g., when a faster or slower convergence is desired). In some cases, noise sensitivity may increase with the magnitude of the REC convergence gain ($K_{REC}$). If the REC convergence gain ($K_{REC}$) is too large, instability may result (e.g., the forward command-based repetitive error correction ($FF_{REC}$) may diverge from optimal values. Thus, in some implementations, the REC convergence gain ($K_{REC}$) may be tuned to achieve a desired balance between convergence rate and noise sensitivity.

In some implementations, the REC convergence gain ($K_{REC}$) may be defined as [21]:

$$K_{REC} < 1 \quad [21]$$

In some implementations, the REC convergence gain ($K_{REC}$) may be set between $\frac{1}{16}$ and $\frac{1}{4}$.

The filtered output $R_F$ output by the gain stage 320 may be summed with an delay buffer entry $DB_i$, where the delay buffer entry $DB_i$ may be given by [22]:

$$DB_m(i) = FF_{REC}(k) + K_{REC} R_F(k) \quad [22]$$

where "m" indicates a SPM revolution number and "i" is the BEMF/timing mark index. In some implementations, the index "i" may be defined as [23]:

$$i = k \text{ modulo } N \quad [23]$$

where "N" represents a number of BEMF/timing mark samples per revolution. The delay buffer entry, $DB_i$, may include a table of "N" RTRO correction values which may be progressively updated every SPM revolution (e.g., where N>1). The table may be used to generate the forward command-based repetitive error correction ($FF_{REC}$) which may cancel the RTRO disturbance effect on the SPM control loop.

In some implementations, the update delay buffer $DB_m(i)$ as defined in [22] may behave in a manner similar to a least-mean-squares (LMS) equation to reduce any plant modeling errors and system noise. In some implementations, the REC convergence gain ($K_{REC}$) also may be tuned to further reduce any noise sensitivity.

The feed-forward command-based repetitive error correction ($FF_{REC}$) and the output processed by the gain stage 320 may be summed by the adder 322, the output of which may be forwarded to an average module 324. In some implementations, though the output from the gain stage 320 includes the feed-forward command-based repetitive error correction ($FF_{REC}$), the feed-forward command-based repetitive error correction ($FF_{REC}$) may also include a DB entry calculated with a one revolution delay.

Although RTRO is defined to be zero mean, due to prediction errors, the predicted repeatable timing run-out ($R_p$) 312 may have a non-zero DC bias. Because the DB update equation (as will be given below with respect to equation [24]) is integral in nature, the delay buffer may drift to large values and wildly diverge from RTRO. Accordingly, in some implementations, the DC bias component may be removed from the DB table. In some implementations, the average of all "N" values in the DB table may be a good estimate of the DC bias. Specifically, the average module 324 may be used to calculate a revolution average of delay (mean value of DB at revolution m) after each revolution in order to determine the DC bias component associated with the RTRO.

In some implementations, the average of REC delay buffer for the current revolution m may be updated, as may be given by [24]:

$$\overline{DB_m} = \frac{SumDB}{N} = \frac{1}{N} \sum_{i=0}^{N-1} DB_i \quad [24]$$

Meanwhile, the output of the adder 322 also may be fed to a delay buffer 326, which delays the output by one revolution. In some implementations, the output may be delayed by one revolution because a repetitive disturbance generally includes components which repeat every revolution such that a correction signal that repeats every revolution may be used to cancel out the components at each revolution. In order to generate the repeatable correction signal, in some implementations the delay buffer 320 implements an one-revolution delay. An "M" revolution delay (e.g., where M>1) also may be used if the disturbances include components which repeat every "M" revolutions. In such a case, the DB table may then be adjusted to include M*N entries.

By subtracting the average of REC delay buffer from the update delay buffer $DB_m(i)$, for every BEMF timing mark around one revolution, the feed forward command-based repetitive error correction ($FF_{REC}$) corresponding to the BEMF timing mark, will have a generally zero mean value and be used to cancel out any systematic component in the error for each BEMF timing mark.

Subsequently, the feed forward command-based repetitive error correction ($FF_{REC}$) may be determined from the delay buffer $DB_i(k-N)$ (e.g., which may be updated in a previous revolution via feedback line 328) subtracted by the average of REC delay buffer, as may be given by [25]:

$$FF_{REC}(k)=DB_i(k-N)-\overline{DB}_m \qquad [25]$$

The value of $DB_i(k-N)$ may be determined using "N" samples (or 1 revolution) before a current sample "k". In some implementations, a mean value for revolution "m" may be subtracted (e.g., from the value of $DB_i(k-N)$) to eliminate the presence of any residual DC bias.

From equations [17], [22] and [25], it can be seen that each DB entry may be updated based on its value determined one revolution before, subtracted by the DB table average from a previous revolution, and combined with the filtered predicted RTRO attenuated by a convergence gain ($K_{REC}$).

As discussed above, the update delay buffer $DB_m(i)$ may behave in a manner similar to an LMS equation that reduces any plant modeling errors and system noise. In some implementations, the delay buffer DB converges to an averaged RTRO sequence in an LMS manner (e.g., as the feed-forward command-based repetitive error correction ($FF_{REC}$) converges to and cancels out the RTRO sequence, the corrected STE (CSTE), the predicted repeatable timing run-out ($R_P$) and the filtered output ($R_F$) may be reduced to non-repetitive noise processes that allow the delay buffer DB to become substantially a fixed table).

The feed forward command-based repetitive error correction ($FF_{REC}$) may then be used, for example, as a correction factor to correct errors associated with RTRO. Specifically, as can be observed from equation [25], as the difference between the delay buffer $DB_m(i)$ and the average of REC delay buffer $\overline{DB}_m$ approaches zero, the feed forward command-based repetitive error correction ($FF_{REC}$) also converges to –RTRO, which allows the STE to approach negative feed forward command-based repetitive error correction (i.e., $-FF_{REC}$) and the corrected STE (CSTE) to approach zero.

If the corrected STB (CSTE) 304 becomes zero, the predicted repeatable timing run-out ($R_p$) 312 also gradually becomes zero. This is because $R_P=TMI_p-TMI_{target}-CSTE=\Delta_m+\Delta_p-CSTE$. As the corrected STE (CSTE) approaches zero, the predicted repeatable timing run-out ($R_p$) 312 approaches $\Delta_m+\Delta_p$, which may be defined as small non-repetitive errors. When $\Delta_m+\Delta_p$ is averaged rev-to-rev, the value of $\Delta m+\Delta p$ as well as the value of the predicted repeatable timing nm-out ($R_p$) 312 also would approach zero.

From equation [5], the predicted timing mark interval ($TMI_p$) 308 and the targeted timing mark interval ($TMI_{Target}$) 310 are essentially equal (i.e., $TMI_p=TMI_{Target}$). When the predicted timing mark interval ($TMI_p$) 308 and the targeted timing mark interval ($TMI_{Target}$) 310 are equal, indicating that the repeatable error is at its minimum and that the feed forward command-based repetitive error correction ($FF_{REC}$) has become a fixed sequence, no further repeatable error correction may be needed.

As discussed previously, REC performance may depend on an accurate SPM model (e.g., as provided by the SPM model function ($G_{SPM}$) 306) in order that an accurate estimate of RTRO can be obtained. In some implementations, the SPM model parameters A, B and C as provided in equations [7], [8] and [9] may be calibrated or tuned using an adaptation method. Specifically, during operation, the spindle motor 106 may be spun up to an operating speed under, for example, a closed-loop setting. Then, the model function 306 may be enabled. In these implementations, repetitive error correction may be disabled by setting the REC update gain ($K_{REC}$) 320, for example, to zero. During this calibration period, model parameters A and B may be tuned based on equations [7] and [8] respectively while parameter C may be tuned using the following least mean square algorithm as may be given by [26]:

$$C(k)=C(k-1)+\mu \cdot [TMI_P(k+1)-TMI_{Target}(k+1)] \qquad [26]$$

Figure 5A:
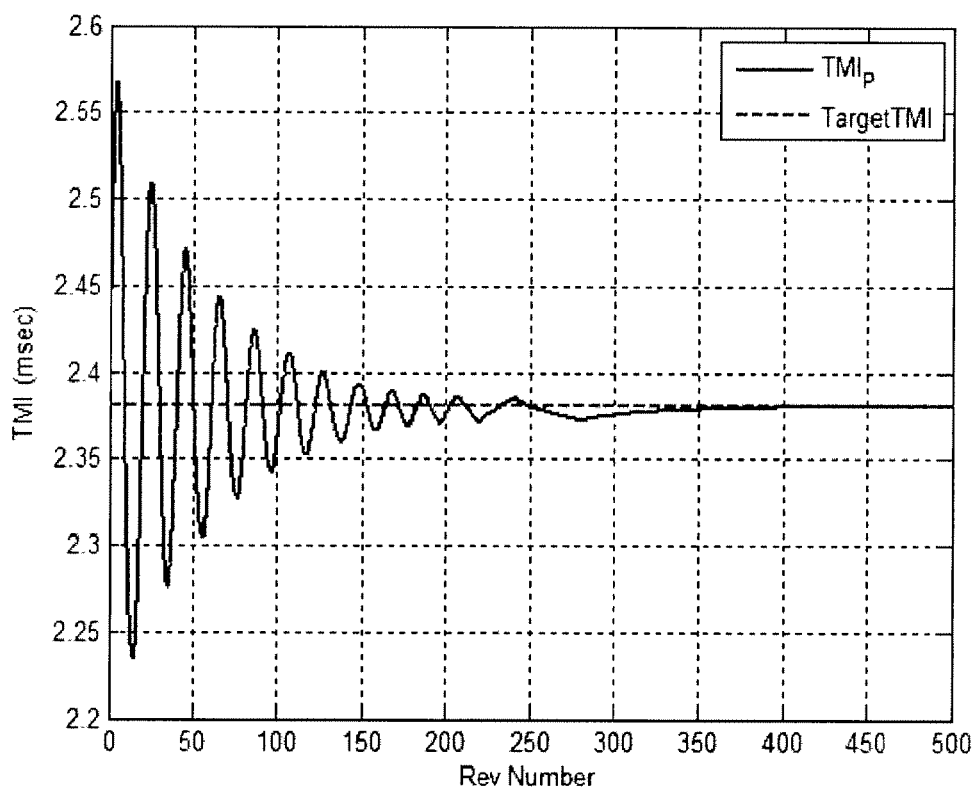
FIG. 5A is a graph showing the convergence of a predicted timing mark interval with respect to a targeted timing mark interval.
Figure 5B:
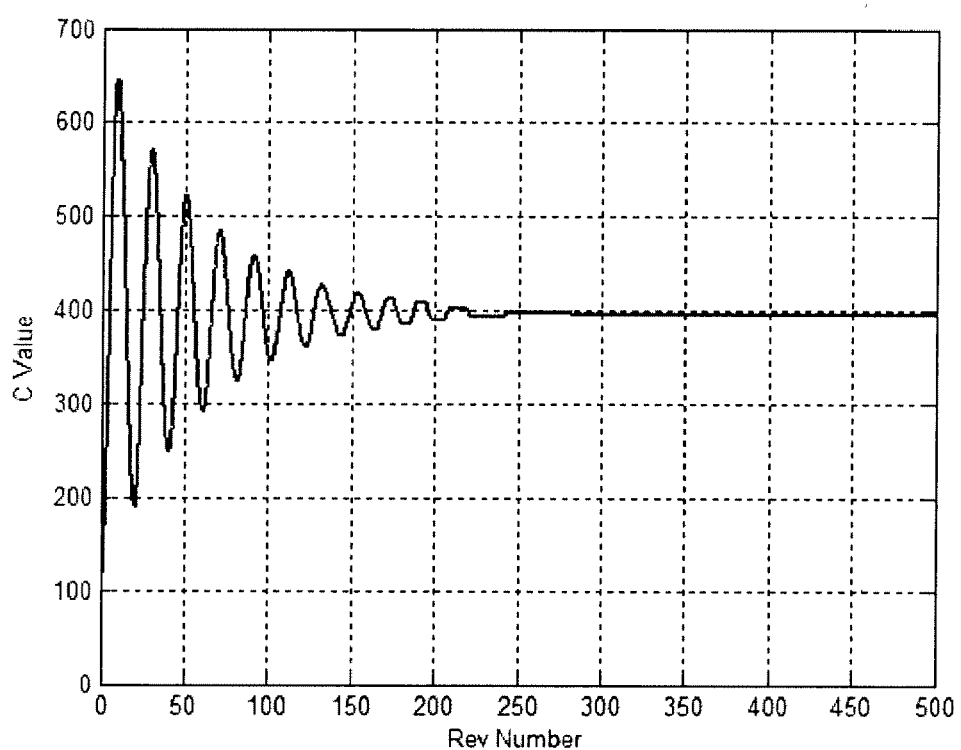
FIG. 5B is a graph showing the convergence of model parameter "C".

As the model parameters A, B and C are continuously determined (e.g., per revolution), the existing model function is regularly updated so as to generate an accurate predicted timing mark interval ($TMI_p$) 308. In some implementations, it is noted that as C(k) converges to the desired calibrated value, the predicted timing mark interval ($TMI_p$) 308 also gradually becomes the targeted timing mark interval ($TMI_{Target}$) 310. For example, temporarily referring to FIG. 5A, as the number of revolutions increases, the predicted timing mark interval ($TMI_p$) becomes stable and approaches the targeted timing mark interval ($TMI_{Target}$). As an example, the predicted timing mark interval ($TMI_p$) converges to the targeted timing mark interval ($TMI_{Target}$) at about the $400^{th}$ revolution. FIG. 5B shows that model parameter C adapts to its final value (e.g., 400) within about 300 revolutions.

After the predicted timing mark interval ($TMI_p$) 308 converges to the targeted timing mark interval ($TMI_{Target}$) 310, calibration may be halted, and the REC update gain ($K_{REC}$) 320 may be reset to a default value to enable repetitive error correction.

Figure 4:
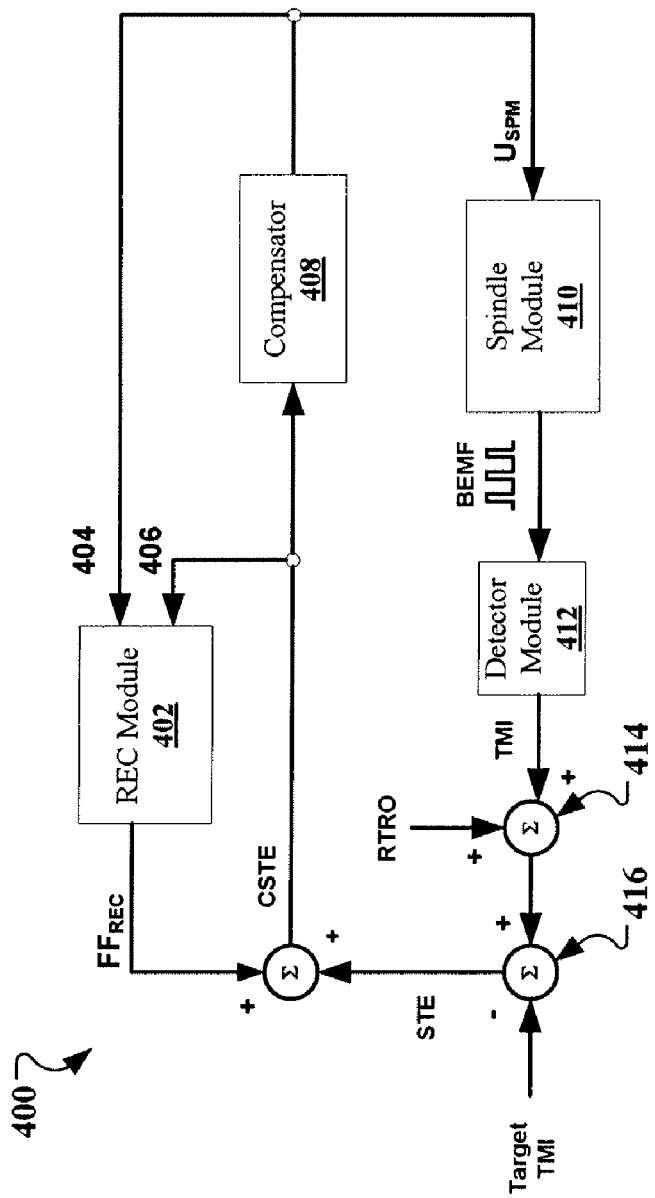
FIG. 4 shows an example spindle motor phase locked loop system that includes a REC module.

FIG. 4 shows an example spindle motor phase locked loop system 400 that includes a REC module 402 similar to the REC module 300 shown in FIG. 3. The REC module 400 may receive a SPM DAC command ($U_{SPM}$) 404 and a corrected STE (CSTE) 406 as inputs. In some implementations, the SPM DAC command ($U_{SPM}$) 404 may be adjusted by a compensator 408 prior to being received by the REC module 402. In some implementations, the compensator 408 may be a FLL or PLL compensation filter that applies FLL or PLL compensation to the SPM DAC command ($U_{SPM}$) 404, as may be given by [27]:

$$U_{SPM}(k)=COMP(z)*CSTE(k) \qquad [27]$$

where "k" is the SPM control sample number. In these implementations, the compensator 408 may be used to implement frequency lock or phase lock for better speed control. For example, a frequency lock algorithm may be enabled, where the algorithm calculates the difference between consecutive timestamps, then compares the time interval against the expected ideal time interval. If the measured interval is greater than the expected interval, the motor speed may be increased. Similarly, if the measured interval is shorter than the expected time interval, the motor sped may be decreased.

In addition to providing the SPM DAC command ($U_{SPM}$) 404 to the REC module 402, the SPM DAC command ($U_{SPM}$) 404 also may be provided to the spindle module 410. In some implementations, the spindle module 410 may include a DAC and spindle/VCM driver (e.g., spindle/VCM driver 114 shown in FIG. 1). The spindle/VCM driver may be used to generate BEMF signals for controlling the acceleration of the spindle motor 106 up to a desired operating spin rate. BEMF signals generated by the spindle module 410 may be monitored and detected by the detector module 412, which determines the timing mark interval associated with the detected BEMF signals.

In some implementations, the spindle motor timing error (STE) may be determined by adding (e.g., through adder 414) the timing mark interval (e.g., output by the detector module 412) and the RTRO and subtracting (e.g., via adder 416) from the targeted timing mark interval $TMI_{Target}$, as may be defined by [28]:

$$STE = TMI + RTRO - TMI_{Target} \quad [28]$$

Using equation [28], the corrected STE (CSTE) may be determined from equation [18] given above.

Figure 6A:
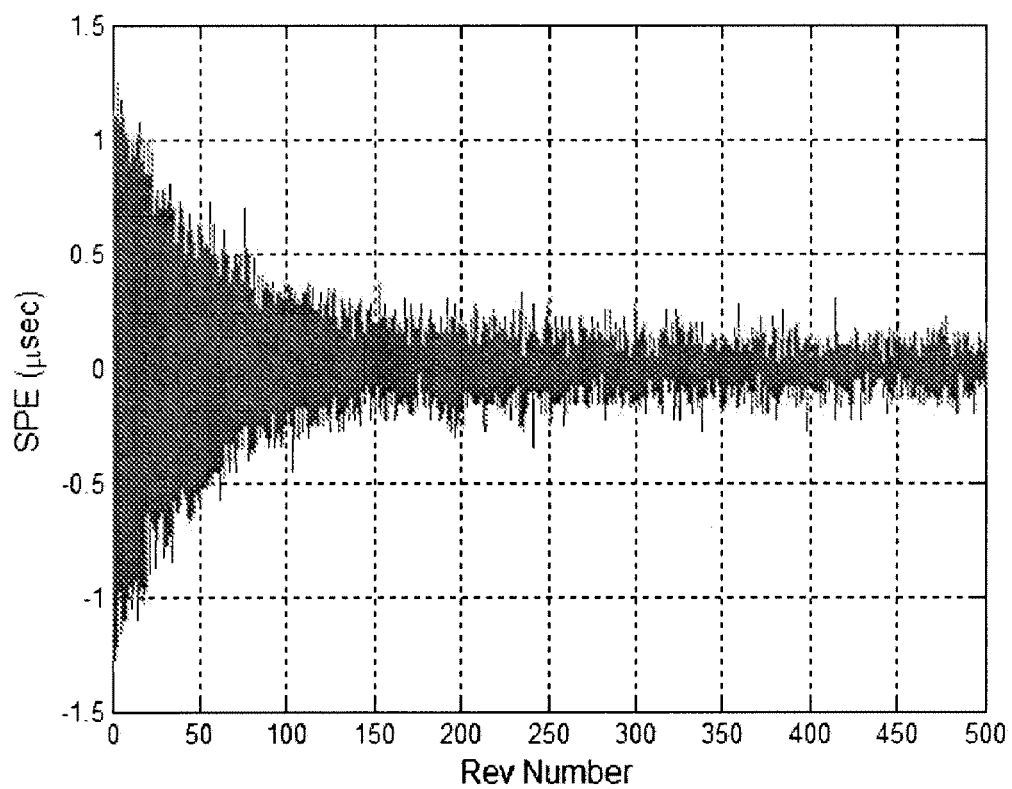
FIG. 6A shows an example of spindle motor phase error response after repetitive error correction is enabled.

FIG. 6A shows an example spindle motor phase error response after repetitive error correction is enabled. In some implementations, the spindle motor phase error at control sample "k" may be determined as may be given by [29]:

$$SPE(k) = MSP(k) - TST(k) \quad [29]$$

where the measured SPM phase (MSP) and the target SPM phase (TST) may be given by [30] and [31] respectively:

$$MSP(k) = \sum_{i=1}^{k} TMI_m(i) \quad [30]$$

$$TSP(k) = k * TMI_{target} \quad [31]$$

From the measured SPM phase (MSP) and the target SPM phase (TST), the spindle motor phase error may be given as [32]:

$$SPE(k) = \left[\sum_{i=1}^{k} TMI_m(i)\right] - k \cdot TMI_{target} = \sum_{i=1}^{k} [TMI_m(i) - TMI_{target}] \quad [32]$$

Since the spindle motor timing error may be given as $STE(k) = TMI_m(k) - TMI_{target}$, the spindle motor phase error may be determined by integrating the STE as may be given by [33]:

$$SPE(k) = \sum_{i=1}^{k} STE(i) \quad [33]$$

Figure 6B:
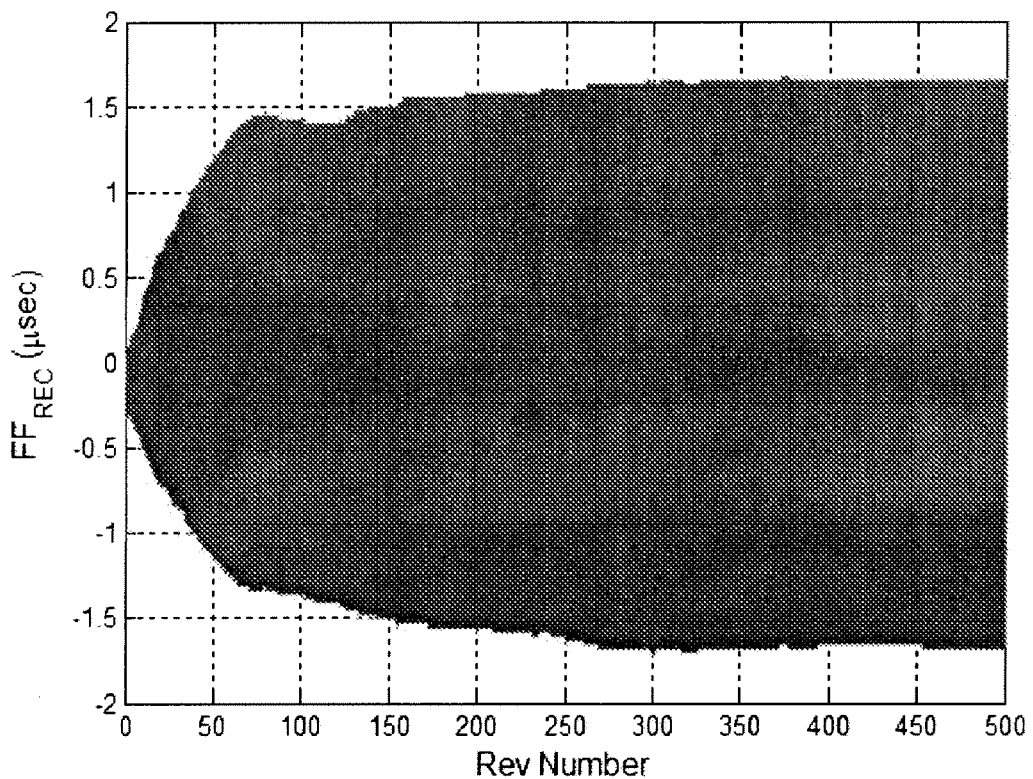
FIG. 6B shows an example of feed forward command-based repetitive error correction after repetitive error correction is enabled.

As shown in FIG. 6A, after repetitive error correction is enabled, spindle motor phase error reduces from about +/−1.25 μsec to about +/−0.2 μsec within substantially 300 revolutions. FIG. 6B shows an example feed forward command-based repetitive error correction ($FF_{REC}$) after repetitive error correction is enabled. As shown in FIG. 6B, the feed forward command-based repetitive error correction ($FF_{REC}$) reaches a stead state within 300 revolutions. In some implementations, convergence time (e.g., the number of revolution) may be tuned by adjusting the REC update gain ($K_{REC}$). For example, adjusting the REC update gain ($K_{REC}$) may be tuned such that the feed forward command-based repetitive error correction ($FF_{REC}$) may reach a steady state within less than 300 revolutions.

Figure 7A:
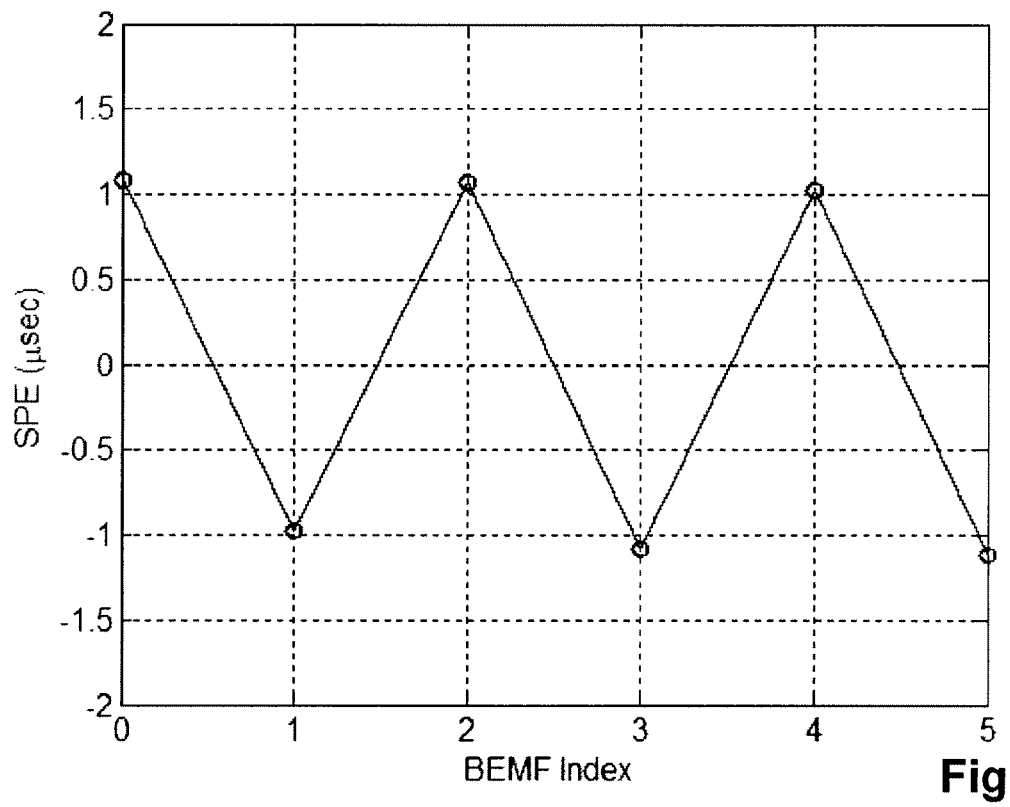
FIG. 7A shows an example of average spindle motor phase error before repetitive error correction is enabled.
Figure 7B:
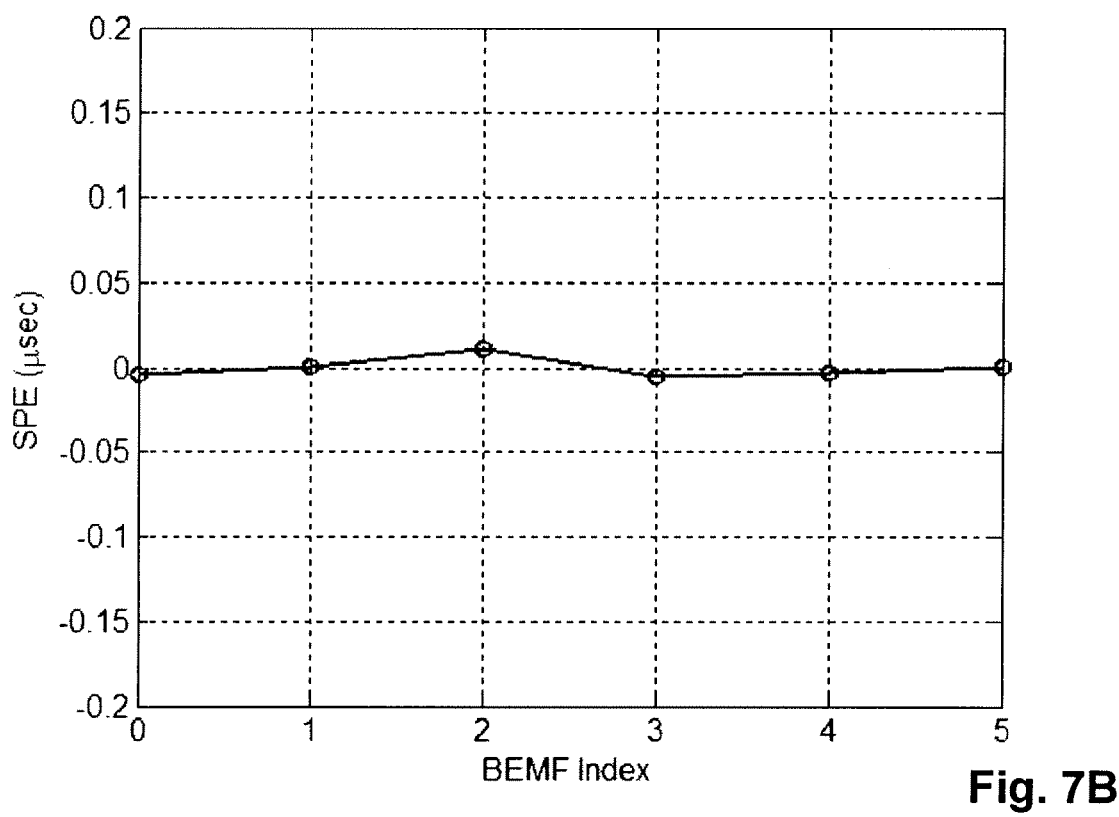
FIG. 7B shows an example of average spindle motor phase error after repetitive error correction is enabled.

FIG. 7A shows an example average spindle motor phase error before repetitive error correction is enabled. As shown, the spindle phase error toggles between +/−1 μsec. FIG. 7B shows an example spindle motor phase error after repetitive error correction is enabled. After repetitive error correction is enabled, steady state amplitude of spindle motor phase error repeatable component may be reduced by about a factor of substantially 100.

Figure 8:
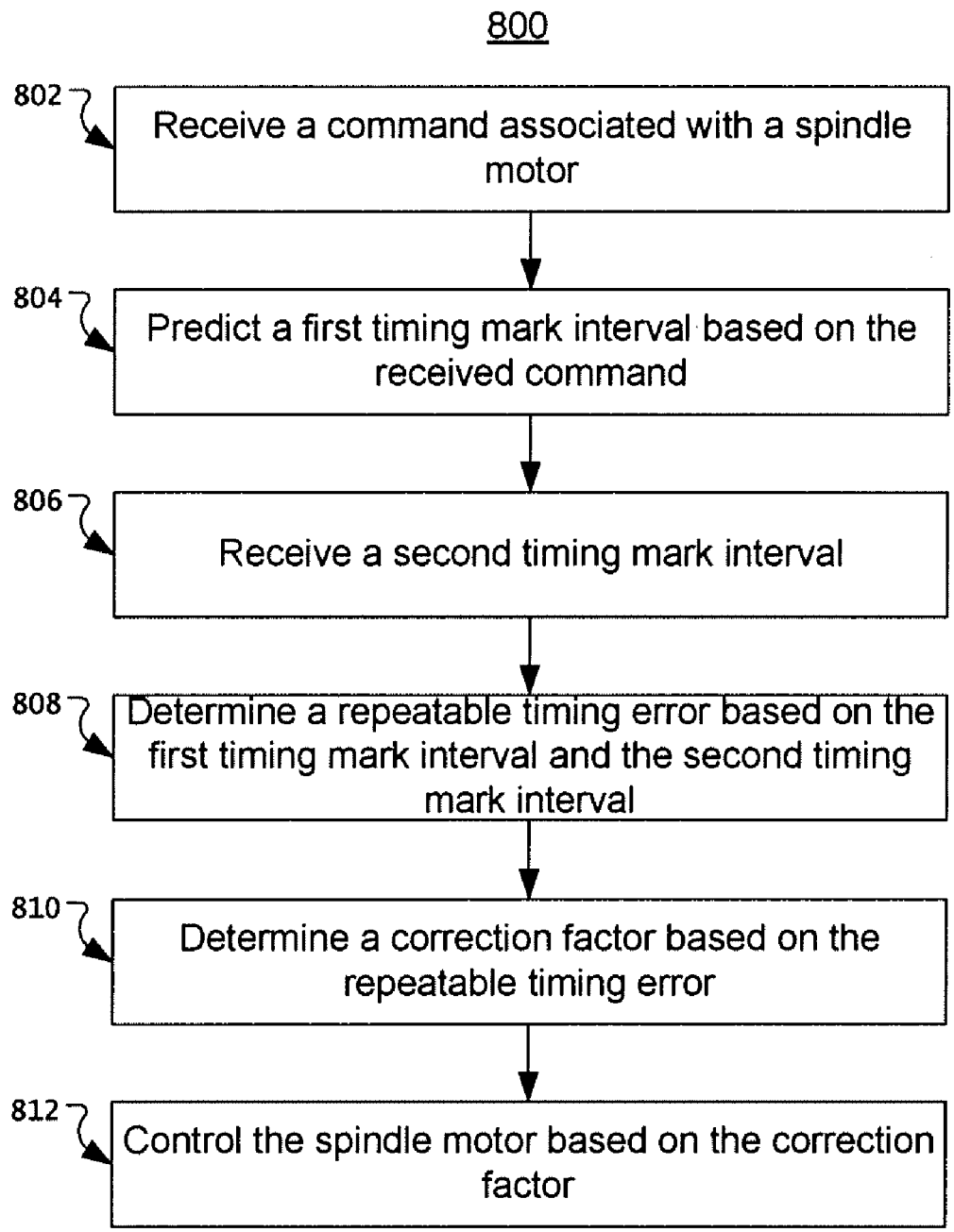
FIG. 8 is an example process for determining a correction factor for the feed forward command-based repetitive error correction.

FIG. 8 is an example process for determining a correction factor for the feed forward command-based repetitive error correction. The process 800 may be performed, for example, by the HDD system 100, and for clarity of presentation, the description that follows uses the HDD system 100 as the basis of examples for describing the process 800. However, another system, or combination of systems, may be used to perform the process 800.

Process 800 begins with receiving a command associated with a spindle motor (802). A first timing mark interval is predicted based on the received command (804). A second timing mark interval is received (806). Based on the first timing mark interval and the second timing mark interval, a repeatable timing error is determined (808). Subsequently, a correction factor is determined based on the repeatable timing error (810). Using the correction factor, the spindle motor is controlled (812).

In some implementations, operations 802-812 may be performed in the order listed, in parallel (e.g., by the same or a different process, substantially or otherwise non-serially), or in reverse order to achieve the same result. In other implementations, operations 802-812 may be performed out of the order shown. Also, the order in which the operations are performed may depend, at least in part, on what entity performs the method. Operations 802-812 also may be performed by the same or different entities or systems.

Example Implementations of Hard Disk Drive

Figure 9:
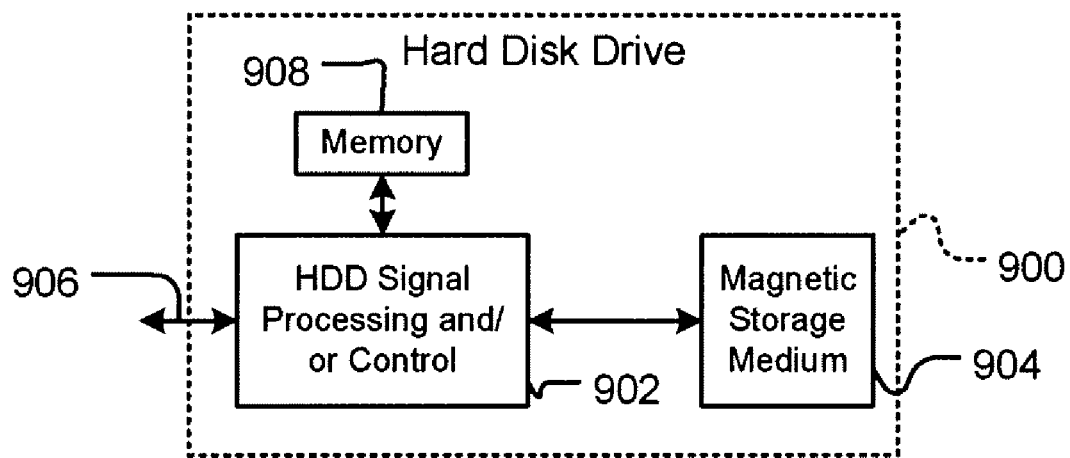
FIGS. 9-15 show various example electronic systems implementing a hard disk drive system.

FIGS. 9-15 show various example implementations of the described systems and techniques. Referring now to FIG. 9, the described systems and techniques can be implemented in a hard disk drive (HDD) 900. The described systems and techniques may be implemented in either or both signal processing and/or control circuits, which are generally identified in FIG. 9 as 902. In some implementations, the signal processing and/or control circuit 902 and/or other circuits (not shown) in the HDD 900 may process data, perform coding and/or encryption, perform calculations, and/or format data that is output to and/or received from a magnetic storage medium 904.

The HDD 900 may communicate with a host device (not shown) such as a computer, mobile computing devices such as personal digital assistants, cellular phones, media or MP3 players and the like, and/or other devices via one or more wired or wireless communication links 906. The HDD 900 may be connected to memory 908 such as random access memory (RAM), low latency nonvolatile memory such as flash memory, read only memory (ROM) and/or other suitable electronic data storage.

Figure 10:
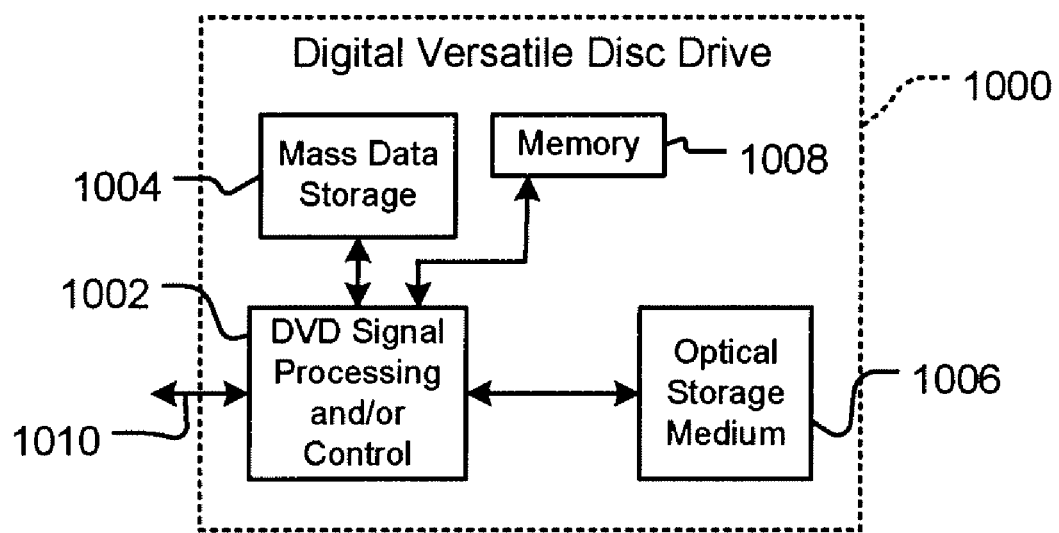

Referring now to FIG. 10, the described systems and techniques can be implemented in a digital versatile disc (DVD)

drive 1000. The described systems and techniques may be implemented in either or both signal processing and/or control circuits, which are generally identified in FIG. 10 as 1002, and/or mass data storage 1004 of the DVD drive 1000. The signal processing and/or control circuit 1002 and/or other circuits (not shown) in the DVD drive 1000 may process data, perform coding and/or encryption, perform calculations, and/or format data that is read from and/or data written to an optical storage medium 1006. In some implementations, the signal processing and/or control circuit 1002 and/or other circuits (not shown) in the DVD drive 1000 can also perform other functions such as encoding and/or decoding and/or any other signal processing functions associated with a DVD drive.

The DVD drive 1000 may communicate with an output device (not shown) such as a computer, television or other device via one or more wired or wireless communication links 1010. The DVD drive 1000 may communicate with mass data storage 1004 that stores data in a nonvolatile manner. The mass data storage 1004 may include a hard disk drive (HDD). The HDD may have the configuration shown in FIG. 9. The HDD may be a mini HDD that includes one or more platters having a diameter that is smaller than approximately 1.8". The DVD drive 1000 may be connected to memory 1008 such as RAM, ROM, low latency nonvolatile memory such as flash memory and/or other suitable electronic data storage.

Figure 11:
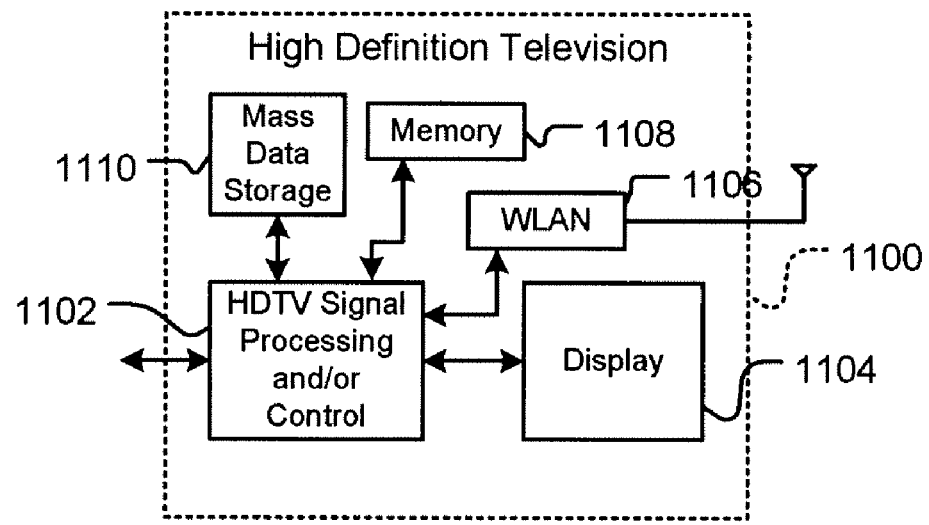

Referring now to FIG. 11, the described systems and techniques can be implemented in a high definition television (HDTV) 1100. The described systems and techniques may be implemented in either or both signal processing and/or control circuits, which are generally identified in FIG. 11 as 1102, a WLAN interface 1106 and/or mass data storage 1110 of the HDTV 1100. The HDTV 1100 receives HDTV input signals in either a wired or wireless format and generates HDTV output signals for a display 1104. In some implementations, signal processing circuit and/or control circuit 1102 and/or other circuits (not shown) of the HDTV 1100 may process data, perform coding and/or encryption, perform calculations, format data and/or perform any other type of HDTV processing that may be required.

The HDTV 1100 may communicate with mass data storage 1110 that stores data in a nonvolatile manner such as optical and/or magnetic storage devices, for example, hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The HDTV 1100 may be connected to memory 1108 such as RAM, ROM, low latency nonvolatile memory such as flash memory and/or other suitable electronic data storage. The HDTV 1100 also may support connections with a WLAN via a WLAN interface 1106.

Figure 12:
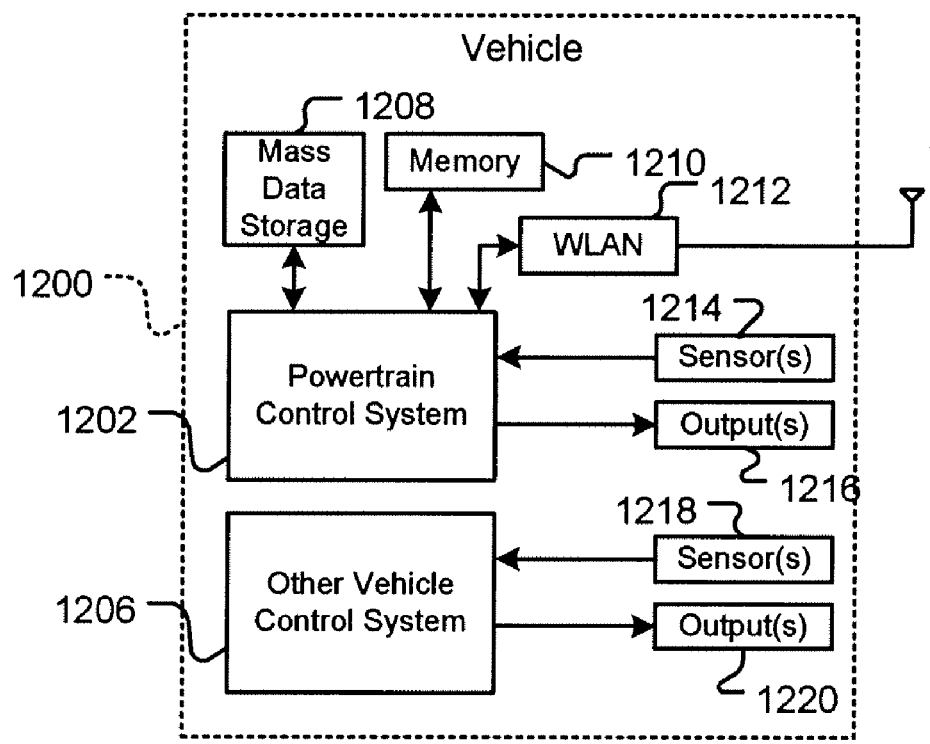

Referring now to FIG. 12, the described systems and techniques may be implemented in a control system of a vehicle 1200, a WLAN interface 1212 and/or mass data storage 1208 of the vehicle control system 1200. In some implementations, the described systems and techniques may be implemented in a powertrain control system 1202 that receives inputs from one or more sensors 1214 such as temperature sensors, pressure sensors, rotational sensors, airflow sensors and/or any other suitable sensors and/or that generates one or more output control signals such as engine operating parameters, transmission operating parameters, braking parameters and/or other control signals to one or more output devices 1216.

The described systems and techniques may also be implemented in other control systems 1206 of the vehicle 1200. The control system 1206 may likewise receive signals from input sensors 1218 and/or output control signals to one or more output devices 1220. In some implementations, the control system 1206 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1202 may communicate with mass data storage 1208 that stores data in a nonvolatile manner. The mass data storage 1208 may include optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The powertrain control system 1202 may be connected to memory 1210 such as RAM, ROM, low latency nonvolatile memory such as flash memory and/or other suitable electronic data storage. The powertrain control system 1202 also may support connections with a WLAN via a WLAN interface 1212. The control system 1206 may also include mass data storage, memory and/or a WLAN interface (all not shown).

Figure 13:
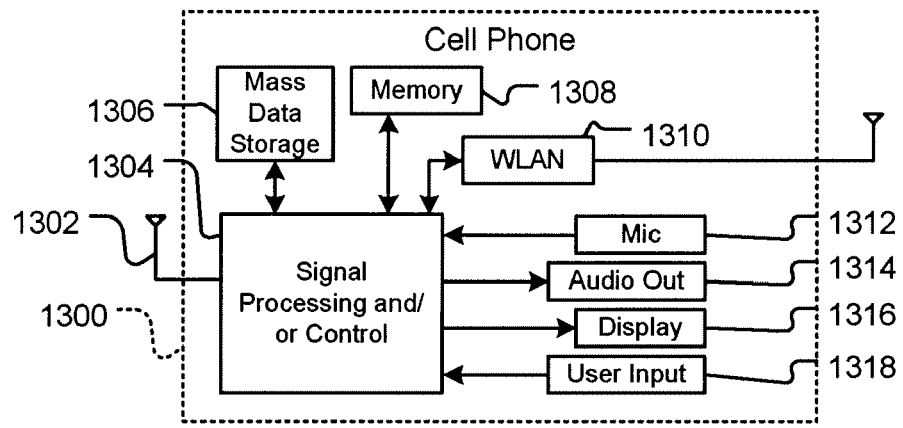

Referring now to FIG. 13, the described systems and techniques can be implemented in a cellular phone 1300 that may include a cellular antenna 1302. The described systems and techniques may be implemented in either or both signal processing and/or control circuits, which are generally identified in FIG. 13 as 1304, a WLAN interface 1310 and/or mass data storage 1306 of the cellular phone 1300. In some implementations, the cellular phone 1300 includes a microphone 1312, an audio output 1314 such as a speaker and/or audio output jack, a display 1316 and/or an input device 1318 such as a keypad, pointing device, voice actuation and/or other input device. The signal processing and/or control circuits 1304 and/or other circuits (not shown) in the cellular phone 1300 may process data, perform coding and/or encryption, perform calculations, format data and/or perform other cellular phone functions.

The cellular phone 1300 may communicate with mass data storage 1306 that stores data in a nonvolatile manner such as optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The cellular phone 1300 may be connected to memory 1308 such as RAM, ROM, low latency nonvolatile memory such as flash memory and/or other suitable electronic data storage. The cellular phone 1300 also may support connections with a WLAN via a WLAN interface 1310.

Figure 14:
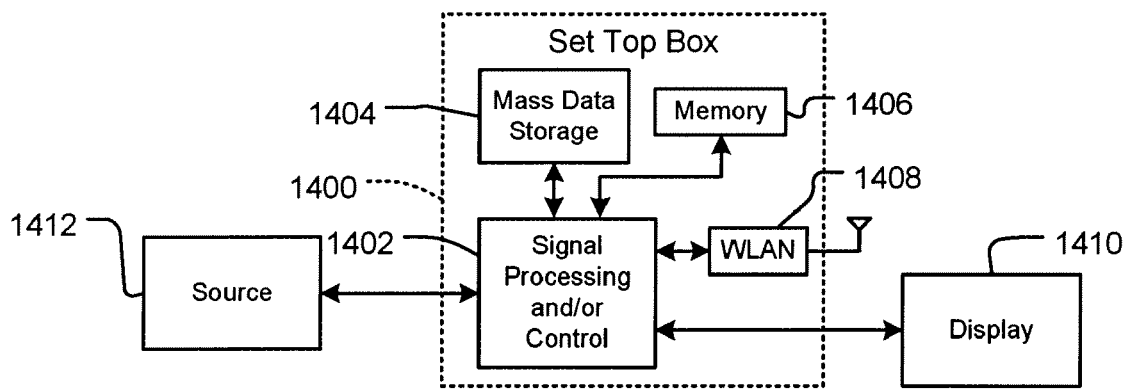

Referring now to FIG. 14, the described systems and techniques can be implemented in a set top box 1400. The described systems and techniques may be implemented in either or both signal processing and/or control circuits, which are generally identified in FIG. 14 as 1402, a WLAN interface 1408 and/or mass data storage 1404 of the set top box 1400. The set top box 1400 receives signals from a source 1412 such as a broadband source and outputs standard and/or high definition audio/video signals suitable for a display 1410 such as a television and/or monitor and/or other video and/or audio output devices. The signal processing and/or control circuits 1402 and/or other circuits (not shown) of the set top box 1400 may process data, perform coding and/or encryption, perform calculations, format data and/or perform any other set top box function.

The set top box 1400 may communicate with mass data storage 1404 that stores data in a nonvolatile manner. The mass data storage 1404 may include optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The set top box 1400 may be connected to memory 1406 such as RAM, ROM, low latency nonvolatile memory such as flash memory and/or other suitable electronic data storage. The set top box 1400 also may support connections with a WLAN via a WLAN interface 1408.

Figure 15:
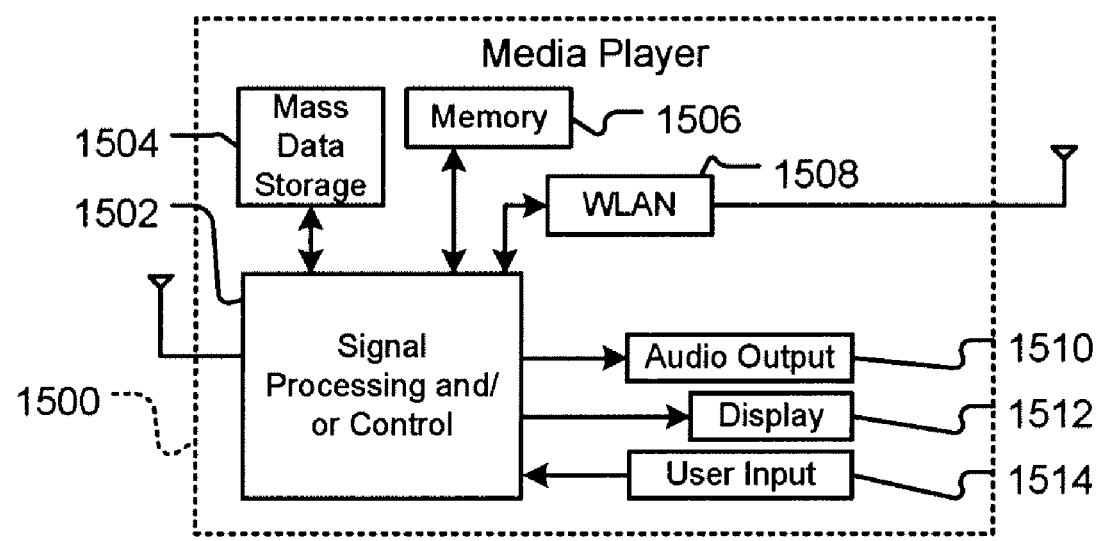

Referring now to FIG. 15, the described systems and techniques can be implemented in a media player 1500. The described systems and techniques may be implemented in either or both signal processing and/or control circuits, which are generally identified in FIG. 15 as 1502, a WLAN interface 1508 and/or mass data storage 1504 of the media player 1500. In some implementations, the media player 1500 includes a display 1512 and/or a user input 1514 such as a keypad, touchpad and the like. In some implementations, the media player 1500 may employ a graphical user interface (GUI) that typically employs menus, drop down menus, icons and/or a point-and-click interface via the display 1512 and/or user input 1514. The media player 1500 further includes an audio output 1510 such as a speaker and/or audio output jack. The signal processing and/or control circuits 1502 and/or other circuits (not shown) of the media player 1500 may process data, perform coding and/or encryption, perform calculations, format data and/or perform any other media player function.

The media player 1500 may communicate with mass data storage 1504 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The media player 1500 may be connected to memory 1506 such as RAM, ROM, low latency nonvolatile memory such as flash memory and/or other suitable electronic data storage. The media player 1500 also may support connections with a WLAN via a WLAN interface 1508. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method comprising:
   receiving a command associated with a spindle motor;
   predicting a first timing mark interval based on the received command;
   receiving a second timing mark interval;
   determining an error based on the first timing mark interval and the second timing mark interval;
   determining a correction factor based on the error; and
   controlling the spindle motor based on the correction factor.

2. The method of claim 1, where controlling the spindle motor includes controlling a speed of the spindle motor based on the correction factor.

3. The method of claim 1, where predicting a first timing mark interval includes:
developing a prediction model for predicting one or more timing mark intervals; and
applying the prediction model to the received command to determine the first timing mark interval associated with the received command.

4. The method of claim 1, where determining an error includes:
identifying a spindle timing error associated with the spindle motor;
determining a corrected spindle timing error based on the spindle timing error and the correction factor; and
determining the error based on the first timing mark interval, the second timing mark interval and the corrected spindle timing error.

5. The method of claim 1, further comprising:
filtering the error using a moving average filter.

6. The method of claim 5, further comprising:
applying a gain to the filtered error;
determining an average timing error over a predetermined number of revolution from the filtered timing error; and
delaying the filtered error,
where determining a correction factor based on the error includes determining the correction factor based on the average timing error and the delayed error.

7. The method of claim 1, where receiving a command associated with a spindle motor includes receiving a spindle motor command associated with controlling one or more performance parameters associated with the spindle motor.

8. The method of claim 1, where determining an error based on the first timing mark interval and the second timing mark interval includes determining a repeatable timing error based on the first timing mark interval and the second timing mark interval.

9. A method comprising:
receiving one or more parameters associated with a spindle motor;
developing a model function based on the received parameters;
predicting a timing parameter of a timing mark interval using the model function;
generating a correction factor from the predicted timing parameter; and
compensating the spindle motor based on the correction factor.

10. The method of claim 9, where receiving one or more parameters of a spindle motor includes:
receiving a spindle motor timing error indicating a difference between the predicted timing parameter and a desired spindle motor timing mark interval.

11. The method of claim 10, where predicting a timing parameter of a timing mark interval includes:
filtering the predicted timing parameter;
applying a gain to the filtered timing parameter;
developing a delay buffer table including one or more correction values; and
generating the correction factor based on the one or more correction values to cancel out timing errors associated with the spindle motor.

12. The method of claim 10, where compensating the spindle motor based on the correction factor includes:
determining a corrected spindle motor timing error based on the correction factor and a spindle motor timing error; and
compensating the spindle motor based on the corrected spindle motor timing error.

13. The method of claim 12, where determining a corrected spindle motor timing error includes adding the correction factor to the spindle motor timing error to determine the corrected spindle motor timing error.

14. The method of claim 12, further comprising compensating the corrected spindle motor timing error by phase locking a rotational phase of the spindle motor to a target phase.

15. The method of claim 12, further comprising compensating the corrected spindle motor timing error by frequency locking a frequency of the spindle motor to a target frequency.

16. The method of claim 9, where developing a model function based on the received parameters include analytically constructing a continuous-time frequency state model.

17. The method of claim 16, where receiving one or more parameters of a spindle motor includes receiving a command from a previous revolution associated with the spindle motor for controlling one or more performance parameters of the spindle motor.

18. The method of claim 9, where receiving one or more parameters associated with a spindle motor includes:
receiving a command associated with controlling one or more performance parameters of the spindle motor; and
determining a predicted timing mark interval based on the model function and the received command.

19. The method of claim 18, further comprising:
determining a target timing mark interval,
where predicting a timing parameter of a timing mark interval includes subtracting the target timing mark interval and a corrected spindle motor timing error from the predicted timing mark interval.

20. The method of claim 18, where receiving a command includes applying a compensation parameter to the correction factor such that a timing error associated with the spindle motor is minimized.

21. The method of claim 11, where generating the correction factor based on the one or more correction values includes:
determining the correction factor associated with a previous revolution including determining one or more correction values from the previous revolution;
determining an average correction value using prior correction values including the one or more correction values determined from the previous revolution; and
determining new correction values for a current revolution based on the average correction value,
where developing the delay buffer table includes developing the delay buffer table for a current revolution using the new correction values for the current revolution, and
where generating the correction factor based on the one or more correction values includes generating the correction factor based on the new correction values.

22. The method of claim 21, further comprising:
determining a new average correction value using prior correction values including the one or more correction values determined from the previous revolution and the current revolution; and
determining new correction values for a next revolution based on the new average correction value,
where developing the delay buffer table further includes developing the delay buffer table for a next revolution using the new correction values for the next revolution, and
where generating the correction factor based on the one or more correction values includes generating the correction factor based on the new correction values for the next revolution.

23. The method of claim 9, where generating a correction factor includes determining a correction factor associated with a feed-forward command-based repetitive error correction.

24. The method of claim 9, where compensating the spindle motor based on the correction factor includes:
   determining a corrected spindle motor timing error based on the correction factor; and
   compensating a timing error associated with the spindle motor using the corrected spindle motor timing error.

25. A method comprising:
   spinning up a spindle motor to an operating speed;
   developing a prediction model using one or more timing parameters associated with the spindle motor;
   calibrating the spindle motor during a first period using the prediction model to obtain a calibrated timing interval; and
   compensating the spindle motor based on the calibrated timing interval to cancel out timing variations associated with the spindle motor during a second period.

26. A system comprising:
   a processor;
   a computer-readable medium operatively coupled to the processor and including instructions, which, when executed by the processor, causes the processor to perform operations comprising:
   receiving a command associated with a spindle motor;
   predicting a first timing mark interval based on the received command;
   receiving a second timing mark interval;
   determining an error based on the first timing mark interval and the second timing mark interval;
   determining a correction factor based on the error; and
   controlling the spindle motor based on the correction factor.

* * * * *